United States Patent
Utke et al.

(10) Patent No.: US 11,087,292 B2
(45) Date of Patent: Aug. 10, 2021

(54) ANALYZING IMAGES AND VIDEOS OF DAMAGED VEHICLES TO DETERMINE DAMAGED VEHICLE PARTS AND VEHICLE ASYMMETRIES

(71) Applicant: Allstate Insurance Company, Northbrook, IL (US)

(72) Inventors: Jean Utke, Lisle, IL (US); Cory Campagna, Deer Park, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/694,022

(22) Filed: Sep. 1, 2017

(65) Prior Publication Data

US 2019/0073641 A1    Mar. 7, 2019

(51) Int. Cl.
*G06Q 10/00* (2012.01)
*G06Q 10/08* (2012.01)
*G06Q 40/08* (2012.01)

(52) U.S. Cl.
CPC ......... *G06Q 10/20* (2013.01); *G06Q 10/0875* (2013.01); *G06Q 40/08* (2013.01)

(58) Field of Classification Search
CPC .... G06Q 30/00; G06Q 30/0633; G06Q 30/06; G06Q 30/641; G06Q 30/601; G06Q 30/02; G06Q 30/04; G06Q 10/20; G06Q 10/087; G06Q 10/06; G06Q 10/10; G06Q 30/0212; G06Q 10/0875; G06Q 40/10
See application file for complete search history.

(56) References Cited

U.S. PATENT DOCUMENTS

| | | | |
|---|---|---|---|
| 8,510,196 B1 | 8/2013 | Brandmaier et al. | |
| 9,208,526 B1 | 12/2015 | Leise | |
| 9,886,771 B1* | 2/2018 | Chen | G06F 3/04845 |
| 9,928,544 B1* | 3/2018 | Hasan | G06T 11/00 |
| 10,332,318 B1* | 6/2019 | Leise | G06Q 30/0206 |
| 2004/0243423 A1* | 12/2004 | Rix | G06Q 10/10 |
| | | | 705/400 |

(Continued)

FOREIGN PATENT DOCUMENTS

| | | |
|---|---|---|
| EP | 2667335 A1 | 11/2013 |
| EP | 3200139 A1 | 8/2017 |
| WO | 2012099692 A1 | 7/2012 |

OTHER PUBLICATIONS

Redinger, "Dealer's Voice: What's the difference between aftermarket and OEM parts?", Friday, Jun. 3, 2016, The Star (Year: 2016).*

(Continued)

*Primary Examiner* — Garcia Ade
(74) *Attorney, Agent, or Firm* — Banner & Witcoff, Ltd.

(57) ABSTRACT

A system may receive video of a damaged vehicle, perform image analysis of the video to determine one or more frames of the video that include a damaged portion of the vehicle, further analyze the one or more frames of the video that include a damaged portion of the vehicle to determine a damaged cluster of parts of the vehicle, determine whether the damaged cluster of parts should be repaired or replaced, map the damaged cluster of parts to one or more parts in a vehicle-specific database of parts, and generate, based on the mapping, a list of parts for repair or replacement.

20 Claims, 14 Drawing Sheets

(56) References Cited

U.S. PATENT DOCUMENTS

| | | | | |
|---|---|---|---|---|
| 2007/0003117 | A1* | 1/2007 | Wheeler | G06T 7/38 |
| | | | | 382/128 |
| 2007/0008344 | A1* | 1/2007 | Medina | H04N 9/3185 |
| | | | | 345/647 |
| 2008/0317289 | A1* | 12/2008 | Oyaizu | H04N 5/217 |
| | | | | 382/107 |
| 2009/0281898 | A1* | 11/2009 | Meis | G06Q 30/06 |
| | | | | 705/14.51 |
| 2013/0317289 | A1* | 11/2013 | Oakes | A61F 5/41 |
| | | | | 600/38 |
| 2013/0317865 | A1* | 11/2013 | Tofte | G06Q 10/06 |
| | | | | 705/4 |
| 2013/0342644 | A1* | 12/2013 | Rusanovskyy | H04N 19/42 |
| | | | | 348/43 |
| 2016/0140417 | A1* | 5/2016 | Kang | G06K 9/00442 |
| | | | | 345/661 |
| 2017/0148102 | A1* | 5/2017 | Franke | G06Q 30/0278 |
| 2017/0293796 | A1* | 10/2017 | Li | G06K 9/6202 |
| 2017/0293894 | A1* | 10/2017 | Taliwal | G06T 7/0004 |

OTHER PUBLICATIONS

Samarins.com, "How to inspect a car body when buying a used car". Dec. 2, 2013. (Year: 2013).*

Nov. 9, 2018—(WO) International Search Report & Written Opinion—PCT/US18/48505.

Jan. 21, 2021—(EP) Extended Search Report—App. No. 18852221.

* cited by examiner

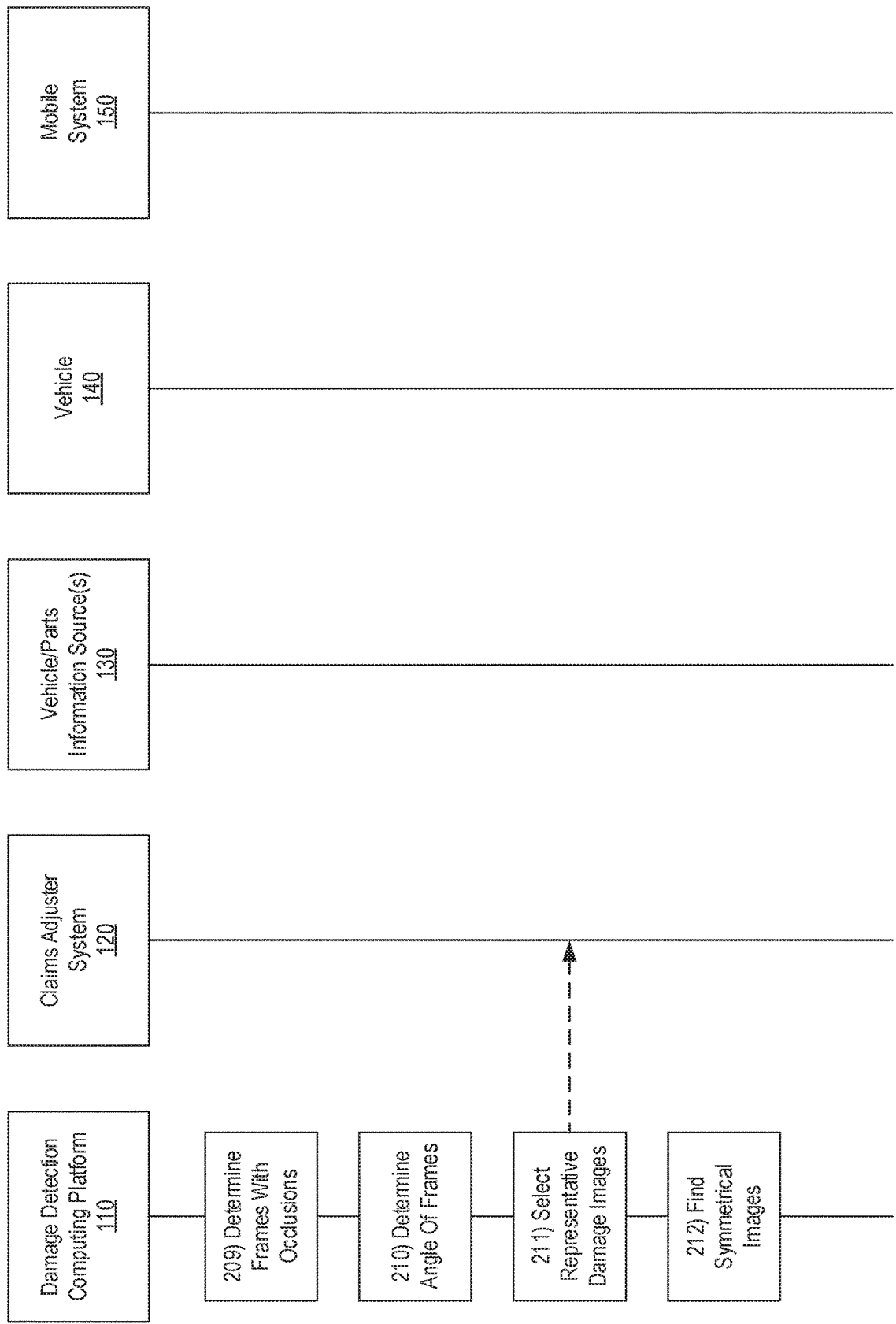

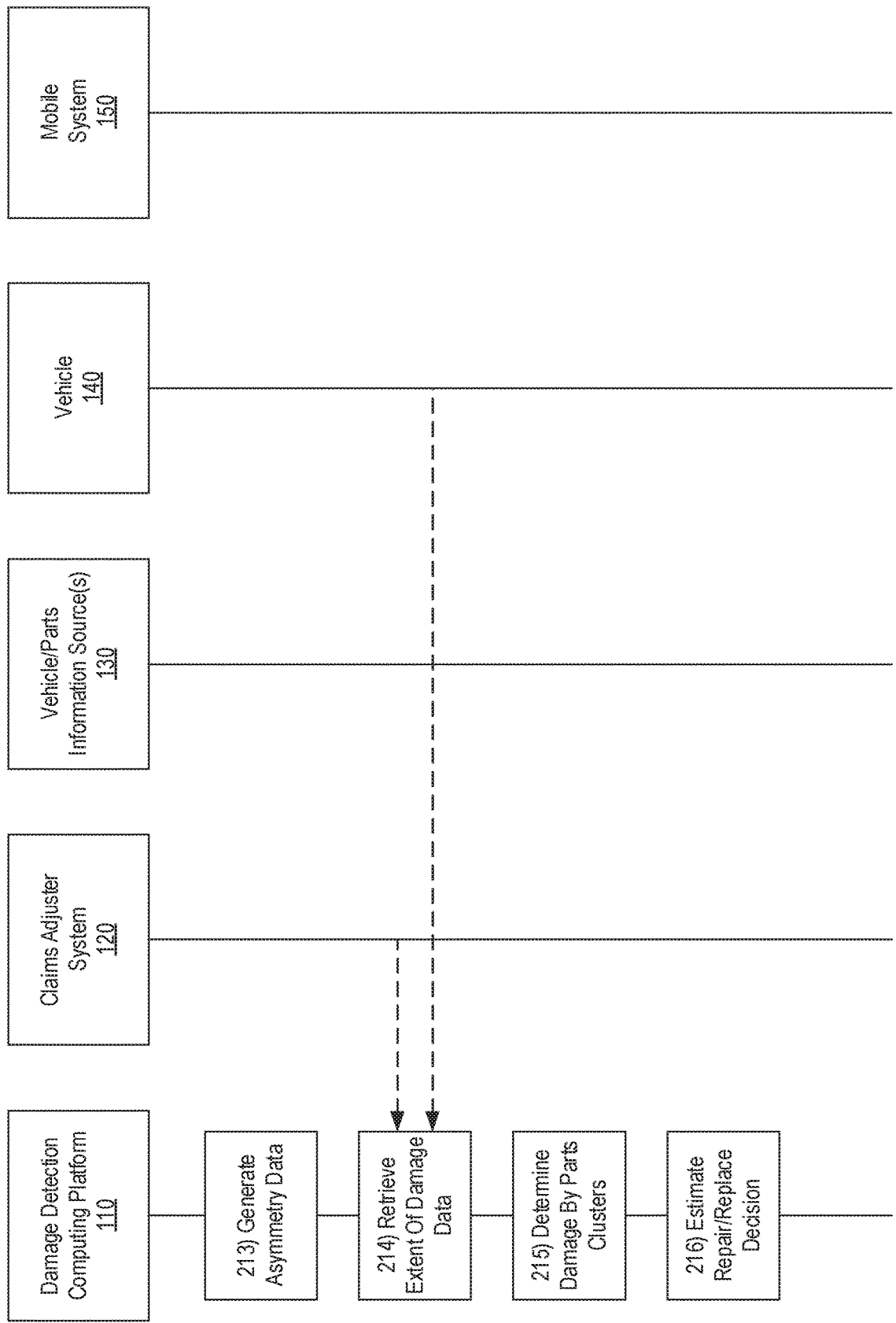

600

```
Automatic Estimate:
       Parts Clusters:      Headlight      Replace
                            Bumper         Repair
       Parts List:
              SKU ABC       $250
              SKU 123       $100           (Available Used)

Labor:               3 hours        $100/hr

Total Cost:          $650

Adjuster Estimate
       Total Cost:          $1000
```
| Edit | | View Photos |

Select Most Relevant Photos:

| Photo 1 | Photo 2 | Photo 3 | Pho |
| Score: .8 | Score: .78 | Score: .75 | |

| Back | | Review Video |

FIG. 7

ANALYZING IMAGES AND VIDEOS OF DAMAGED VEHICLES TO DETERMINE DAMAGED VEHICLE PARTS AND VEHICLE ASYMMETRIES

BACKGROUND

Aspects of the disclosure relate to analyzing images of vehicles for damage and determining damaged parts of vehicles. Previous approaches involve capturing a small number of images of a damaged vehicle after a damage incident. The images are often taken by a vehicle driver or passenger, who may have difficulty capturing good quality images that accurately represent the damaged portions of the vehicle. When the images do not accurately represent the damaged portions of the vehicle, analysis of the images may be inaccurate. Accordingly, improved methods and systems for collecting data about a vehicle damage incident and analyzing the data are needed.

SUMMARY

Aspects of the disclosure provide effective, efficient, scalable, and convenient technical solutions that address and overcome the technical problems associated with analyzing images and videos of damaged vehicles to determine damaged portions of vehicles, damaged parts of vehicles, and whether to repair or replace the damaged portions and/or parts, as well as providing other related functions after a vehicle damage incident.

In accordance with one or more embodiments, a computing platform having at least one processor, a memory, and a communication interface may receive, via the communication interface, video of a damaged vehicle, perform image analysis of the video to determine one or more frames of the video that include a damaged portion of the vehicle, further analyze the one or more frames of the video that include a damaged portion of the vehicle to determine a damaged cluster of parts of the vehicle, determine whether the damaged cluster of parts should be repaired or replaced, map the damaged cluster of parts to one or more parts in a vehicle-specific database of parts, and generate, based on the mapping, a list of parts for repair or replacement.

In some embodiments, the computing platform may also determine asymmetry information by comparing an image of the damaged portion of the vehicle to an image of a symmetrical undamaged portion of the vehicle, and determine, based on the asymmetry information, the damaged cluster of parts and an extent of damage to the damaged cluster of parts. In some embodiments, the determination of whether the damaged cluster of parts should be repaired or replaced is based on the extent of damage. In some embodiments, comparing the image of the damaged portion of the vehicle to the image of the symmetrical undamaged portion of the vehicle comprises normalizing a color and/or brightness of the image of the damaged portion of the vehicle and the image of the symmetrical undamaged portion of the vehicle. In some embodiments, comparing the image of the damaged portion of the vehicle to the image of the symmetrical undamaged portion of the vehicle further comprises horizontally flipping and warping the image of the symmetrical undamaged portion of the vehicle.

In some embodiments, the computing platform may determine an angle of the image of the damaged portion of the vehicle, and determine that the image of the symmetrical undamaged portion of the vehicle is associated with a symmetrical angle.

In some embodiments, performing image analysis of the video comprises comparing a frame of video to a preceding frame and a following frame to determine one or more motion vectors, and determining whether the frame includes reflections or occlusions based on the one or more motion vectors. In some embodiments, performing image analysis of the video comprises determining a lighting quality of one or more frames of the video.

In some embodiments, the computing platform determines, based on the list of parts, and based on a local labor rate estimate, a cost to repair the vehicle. The computing platform may also compare the cost to repair the vehicle to a second cost received from a claims adjuster system, and responsive to the cost and the second cost differing by more than a threshold amount, send an alert to the claims adjuster system. The computing platform may further transmit, to a mobile device, a settlement offer based on the cost, and receive, from the mobile device, an acceptance of the settlement offer.

In some embodiments, the computing platform may select at least one frame, of the one or more frames of the video that depict a damaged portion of the vehicle, as a representative frame of damage, wherein the selection is based on an angle of the at least one frame. The computing platform may further determine a likely-damaged portion of the vehicle based on information received from one or more sensors of the vehicle, and cause a mobile device to display an indication of the likely-damaged portion of the vehicle and an instruction to capture a video of the likely-damaged portion of the vehicle. In some embodiments, the instruction further indicates that the captured video should include a portion of the vehicle that is symmetrical to the likely-damaged portion of the vehicle. The computing platform may further transmit the at least one representative frame to a claims adjuster system, and receive, from the claims adjuster system, a corresponding relevance score for each of the at least one representative frames. The computing platform may further train a model to predict a relevance of an image of a second damaged vehicle using the at least one representative frame and the corresponding relevance score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for analyzing images and videos of damaged vehicles in accordance with one or more example embodiments;

FIGS. 6 & 7 depict example graphical user interfaces that may be used by methods or systems for analyzing images and videos of damaged vehicles in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to capturing one or more videos that contain a large number of images of a damaged vehicle. A mobile estimate application (e.g., installed and/or running on a user mobile device) and/or a damage detection application (e.g., installed on a server or cloud system) may perform quality assurance on the captured video(s) to determine whether they include good quality images of the damaged vehicle. The mobile estimate application and/or damage detection application may then analyze one or more frames of the video to determine which frame(s) of the video contain representative images of damaged portions of the vehicle. The mobile estimate application and/or damage detection application may then perform automatic analyses of the representative images to determine parts that are damaged, the extent of damage to the parts, and whether the damaged parts should be repaired or replaced. In some cases, the mobile estimate application and/or damage detection application may analyze an image of a damaged portion of a vehicle in comparison to an image of a symmetrical undamaged portion of a vehicle (e.g., comparing an image of a damaged left door to an image of an undamaged right door) in order to detect asymmetry information, which may be used in the automatic analyses to determine parts that are damaged, the extent of damage to the parts, and whether the damaged parts should be repaired or replaced.

In some cases, the mobile estimate application and/or damage detection application may further determine a list of vehicle-specific parts that need to be replaced (e.g., by SKU number), a cost to replace each part, a labor rate, a time to repair the vehicle, and a total cost to repair the vehicle. In some cases, mobile estimate application and/or damage detection application may coordinate with a claims adjuster who may manually review the video(s) or images of the vehicle, spot check the automatic analyses, determine cost estimates, and compare the manual cost estimates to the automatic cost estimates. The claims adjuster may provide feedback on the results of the automatic analyses, which may be used to re-train models used by the mobile estimate application and/or damage detection application.

Figure 1A:
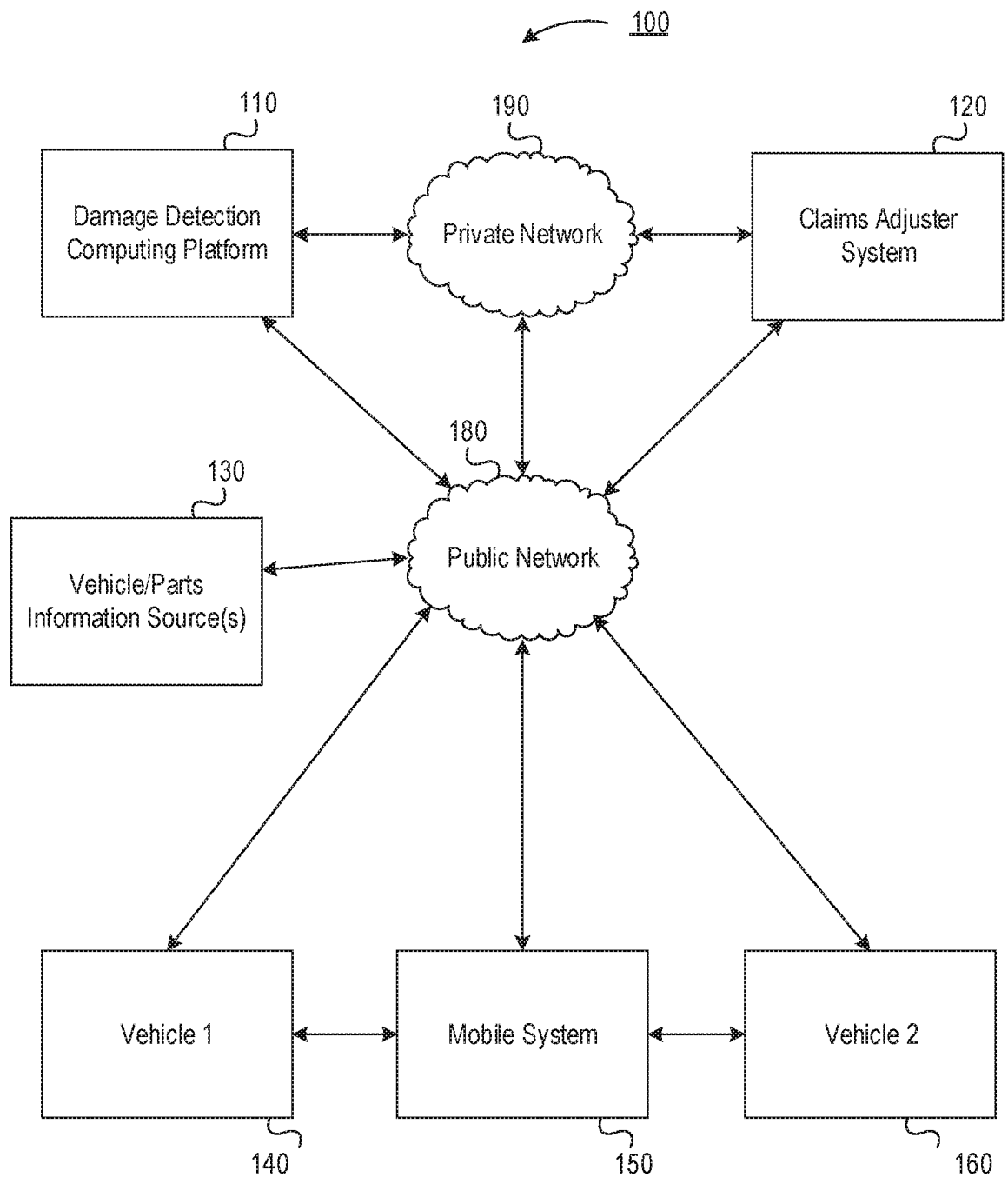
FIGS. 1A-1C depict an illustrative operating environment for analyzing images and videos of damaged vehicles in accordance with one or more example embodiments.
Figure 1B:
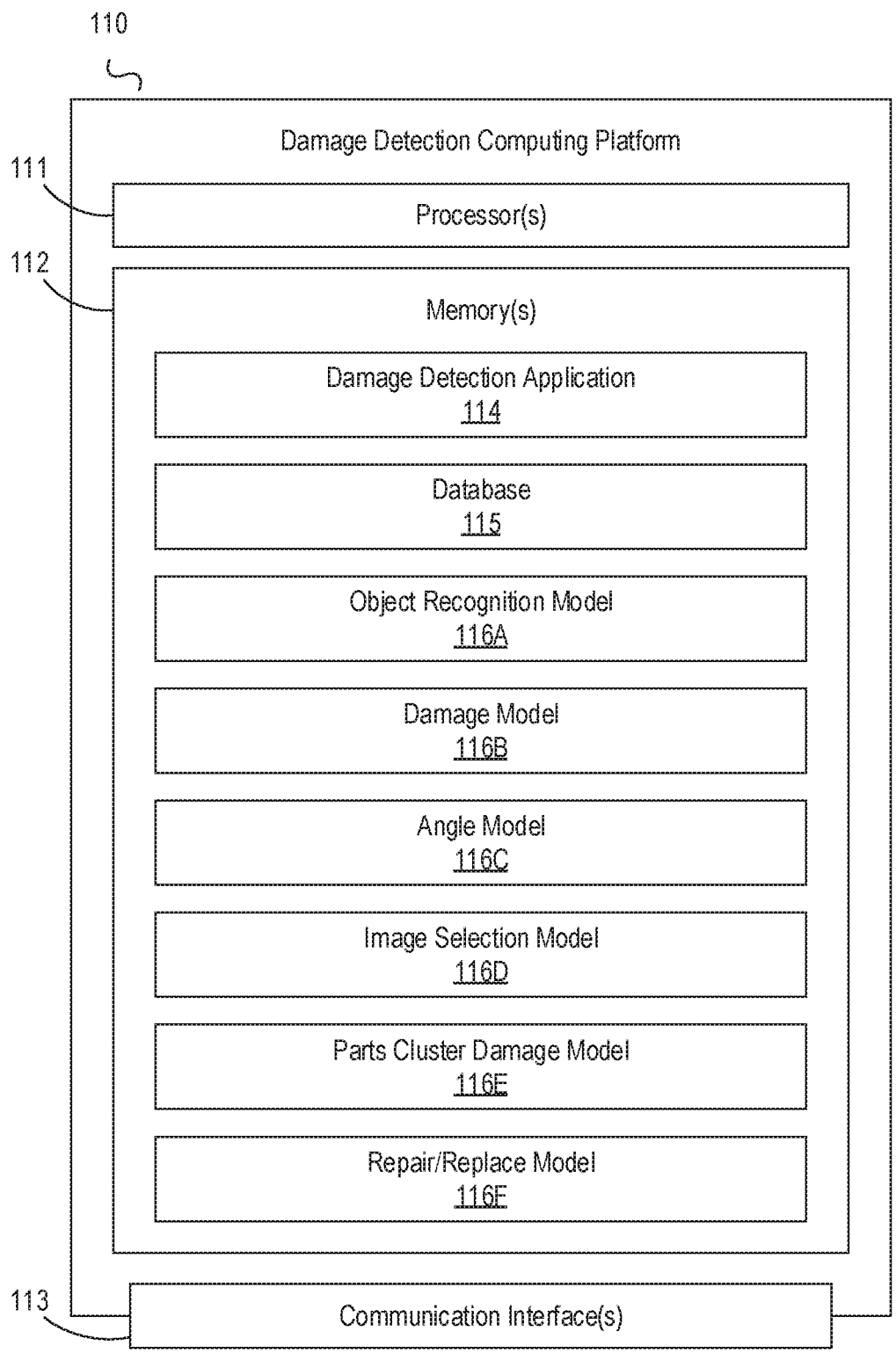
Figure 1C:
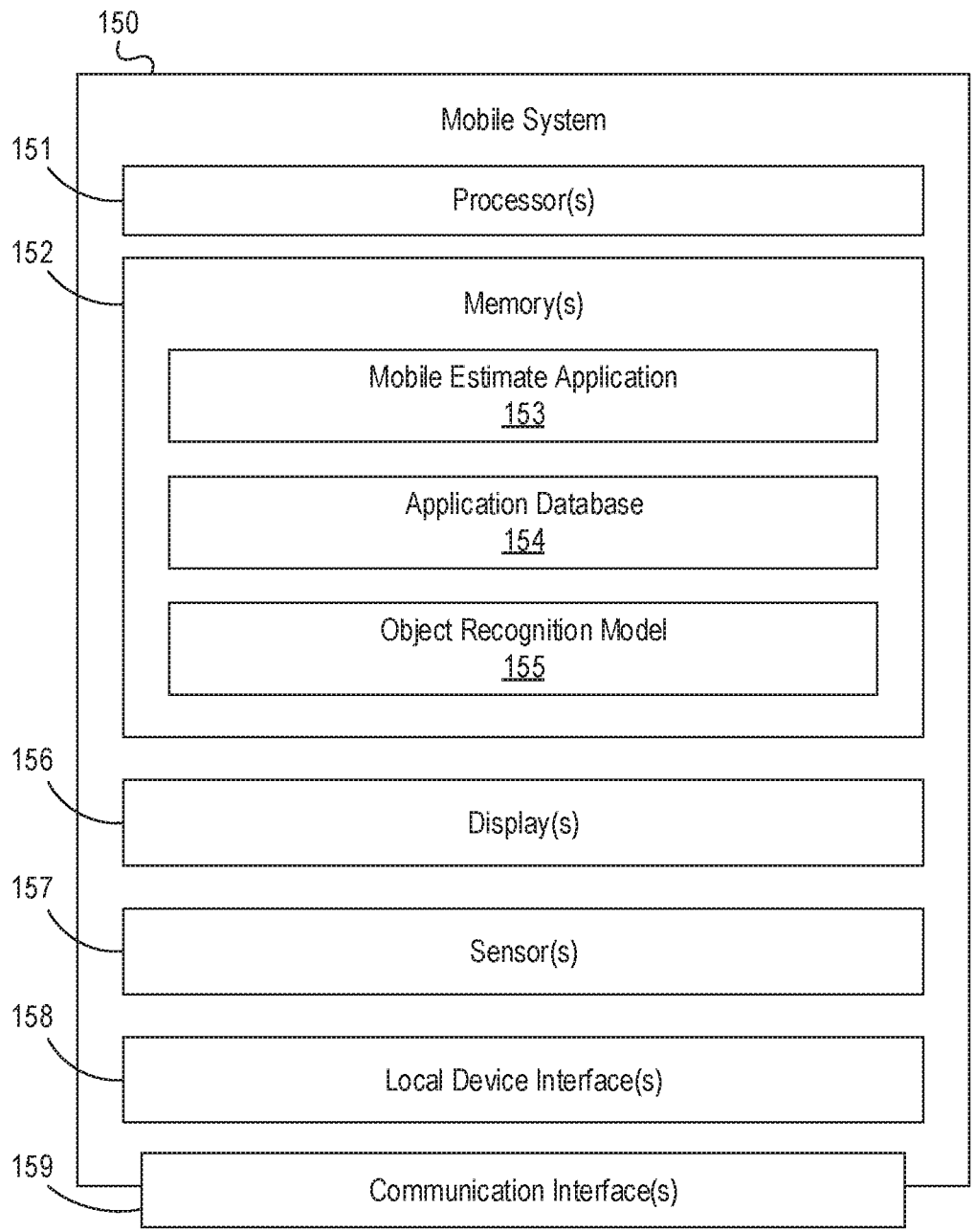

FIGS. 1A, 1B, and 1C depict an illustrative operating environment for using image and video analysis to detect damaged parts of vehicles in accordance with one or more example embodiments. Referring to FIG. 1A, operating environment 100 may include a damage detection computing platform 110, a claims adjuster system 120, vehicle/parts information source(s) 130, a first vehicle 140, a mobile system 150, and a second vehicle 160. In one or more arrangements, the damage detection computing platform 110, claims adjuster system 120, vehicle/parts information source(s) 130, first vehicle 140, mobile system 150, and second vehicle 160 may be connected by a public network 180 (e.g., the Internet) and/or a private network 190 (e.g., a network associated with an entity, such as an insurance provider), each of which may include one or more wired networks and/or one or more wireless networks. In addition, each of the damage detection computing platform 110, claims adjuster system 120, vehicle/parts information source(s) 130, first vehicle 140, mobile system 150, and second vehicle 160 may be special purpose computing devices configured to perform specific functions, as illustrated in greater detail below, and may include specific computing components such as processors, memories, communication interfaces, and/or the like.

For example, the damage detection computing platform 110 may be configured to use image and video analysis to detect damaged parts of vehicles and perform other operations, including automatically determining damaged parts clusters, mapping of parts clusters to vehicle-specific parts lists, determining costs to repair a vehicle, interfacing with claims adjuster systems to provide quality assurance and spot checks, and other related functions. Claims adjuster system 120 may be configured to provide automatically-selected images of damaged vehicles to claims adjusters, present automatic determinations of damage to the claims adjusters, analyze discrepancies between automatic determinations of damage and manual determinations of damage, and provide feedback to the damage detection computing platform 110, among other functions. In some embodiments, damage detection computing platform 110 and claims adjuster system 120 may be parts of a single automatic estimate computing platform (which may be owned and/or operated by a common entity, e.g., an insurance provider or related information company). Accordingly, functions and/or capabilities ascribed herein to either of damage detection computing platform 110 and claims adjuster system 120 may be performed by a single system and/or computing platform. In some embodiments, damage detection computing platform 110 may be associated with a first organization (e.g., an analytics company), and claims adjuster system 120 may be associated with a second organization (e.g., an insurance provider).

Vehicle/parts information source(s) 130 may be configured to collect and provide information about vehicles and/or parts of vehicles, including lists of parts contained in a particular make/model/year of vehicle, databases of used parts for sale, costs of new and used parts, suppliers of parts, suppliers of repair services for vehicles, labor costs of providing repair services for vehicles, and the like. The vehicle/parts information source(s) 130 may comprise one or more third party services and/or may comprise information databases maintained by an organization associated with the damage detection computing platform 110 and/or the claims adjuster system 120.

Mobile system 150 may be configured to capture videos or other images, communicate with vehicles 140 and/or 160, and execute one or more applications. Mobile system 150 may store and execute a mobile estimate application 153 for communicating and interfacing with damage detection computing platform 110, claims adjuster system 120, and/or other devices connected via public network 180 and/or private network 190.

Vehicles 140, 160 may be configured to provide various functions including gathering sensor information, telematics data, and the like. A first vehicle 140 may be associated with a user of the mobile system 150. A second vehicle 160 may be involved in a damage incident that causes damage to the first vehicle 140 (e.g., an accident). The vehicles 140, 160 may be autonomous vehicles, semi-autonomous vehicles, and/or non-autonomous vehicles.

Referring to FIG. 1B, damage detection computing platform 110 may include a processor 111, memory 112, and one or more communication interfaces 113. Processor 111 may control operations of damage detection computing platform 110, and memory 112 may store instructions that, when executed by processor 111, cause damage detection computing platform 110 to perform one or more functions. Communication interface(s) 113 may include one or more wired and/or wireless network interfaces, and communication interface(s) 113 may connect damage detection computing platform 110 to one or more networks (e.g., public network 180 and/or private network 190) and/or enable damage detection computing platform 110 to exchange information and/or otherwise communicate with one or more devices connected to such networks. Memory 112 may store and/or otherwise provide a damage detection application 114 and a database 115. Damage detection application 114 may store instructions that, when executed by processor 111, cause damage detection computing platform 110 to perform the functions and processes ascribed herein to damage detection computing platform 110, among other functions. Database 115 may store information that may be used by damage detection computing platform 110 for performing the processes and functions described herein. Models 116A-F may be used by damage detection computing platform 110 to perform various processes and functions as described herein.

Referring to FIG. 1C, mobile system 150 may include a processor 151, memory 152, and one or more communication interface(s) 159. In some embodiments, mobile system 150 may be a device associated with a driver or passenger of a vehicle (e.g., a mobile phone or other mobile device). Processor 151 may control operations of mobile system 150, and memory 152 may store instructions that, when executed by processor 151, cause mobile system 150 to perform one or more functions. Communication interface(s) 159 may include one or more wired and/or wireless network interfaces, and communication interface(s) 159 may connect mobile system 150 to one or more networks (e.g., public network 180 and/or private network 190) and/or enable mobile system 150 to exchange information and/or otherwise communicate with one or more devices connected to such networks. Memory 152 may store and/or otherwise provide a mobile estimate application 153, an application database 154, and an object recognition model 155. Mobile estimate application 153 may store instructions that, when executed by processor 151, cause mobile system 150 to interface and communicate with damage detection computing platform 110 and/or claims adjuster system 120 in order to capture and upload videos or other images, capture and upload incident information from vehicles 140, 160, and perform other related functions. Application database 154 may store information that may be used by mobile system 150 for executing and performing the functions of the mobile estimate application 153. In some embodiments, the mobile estimate application 153 may be a browser application that accesses web content (e.g., a web page, JavaScript, an applet or other downloadable application, and the like) that configures the browser application to perform the functions described herein. The object recognition model 155 may be used by the mobile estimate application 153 to determine whether captured frames of video include an image of a vehicle.

Mobile system 150 also may include one or more displays 156, sensors 157, and local device interfaces 158. Display(s) 156 may display one or more user interfaces. Display(s) 156 may accept input (e.g., via a touchscreen interface) or be associated with one or more user interfaces that accept input related to the displayed user interfaces. Sensors 157 may sense conditions such as position data, speed data, acceleration data, and other such data. Sensors 157 may include one or more cameras capable of capturing images and video, an accelerometer, a compass, a gyroscope, and other such sensors. In some embodiments, the mobile system 150 may include multiple cameras capable of capturing depth information. Local device interface(s) 158 may include one or more wired and/or wireless communication interfaces and may, for example, enable mobile system 150 to exchange information with and/or otherwise communicate with vehicles 140, 160.

FIGS. 2A, 2B, 2C, 2D, 2E, and 2F depict an illustrative event sequence for controlling operation of a damage detection service that determines damage to a vehicle, a list of parts for replacement, and a repair cost based on videos or still images of the vehicle, among other functions.

Figure 2A:
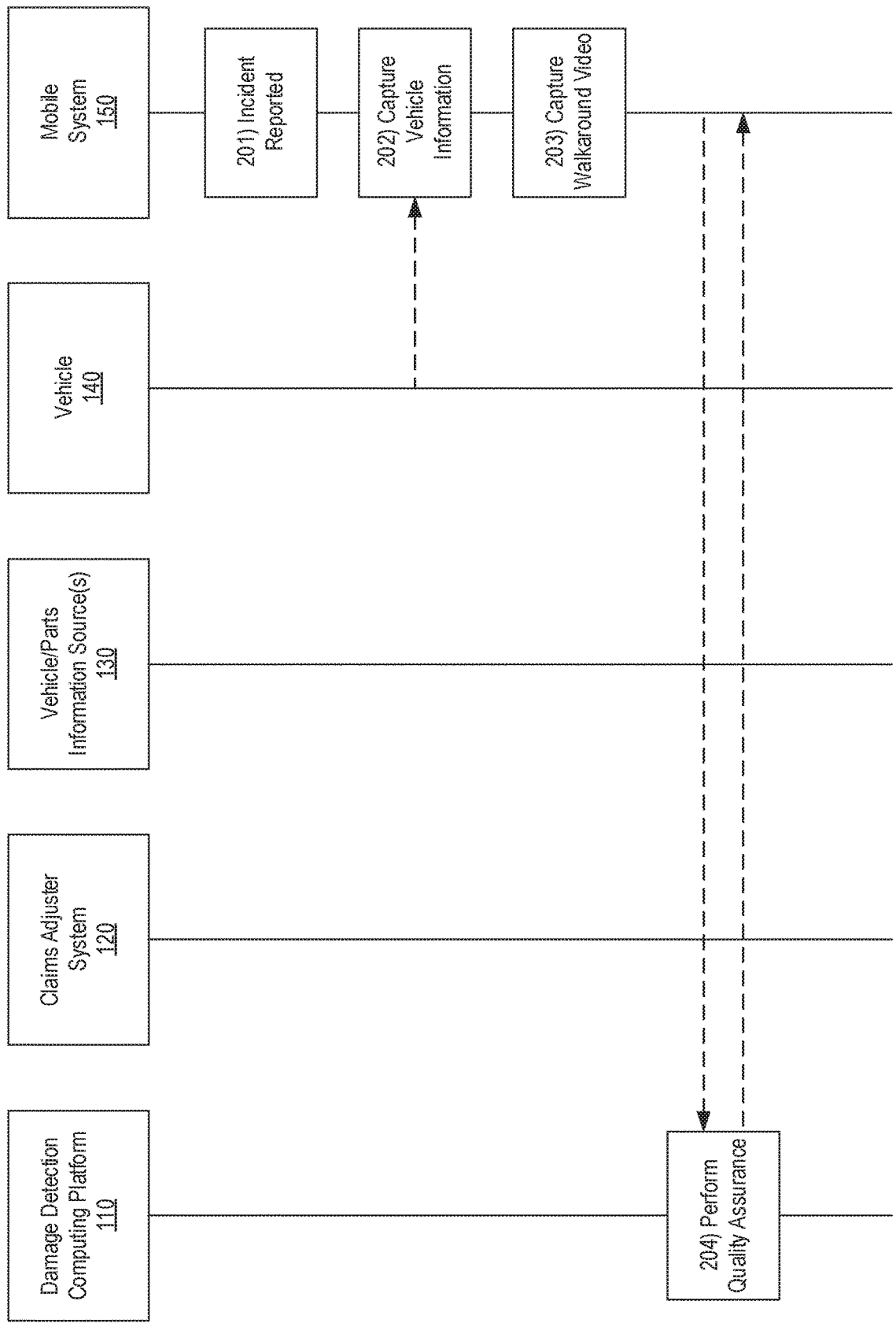

Referring to FIG. 2A, at step 201, the mobile system 150, which may store and execute the mobile estimate application 153 (as referred to in FIG. 1C), may begin an incident reporting process. For example, a user may open the mobile estimate application 153 and select an incident reporting feature to report that an accident or other damage incident has occurred. As another example, the mobile estimate application 153 may automatically detect that an accident has occurred based on accelerometer or other sensor data received from one or more sensors 157 of the mobile system and/or via sensors of a vehicle 140. The mobile estimate application 153 may interact with the user to determine information about the incident such as a number of vehicles involved, whether immediate medical assistance is needed, information about the vehicles such as make/model/year and/or VIN, and other such relevant information about the incident.

At step 202, responsive to beginning the incident reporting procedure and/or inputting preliminary information, the mobile system 150 may capture further information about the incident from the vehicle 140. The mobile system 150 may communicate with the vehicle 140 via a communication interface 155 of the mobile system 150. For example, the mobile estimate application 153 may cause the mobile system 150 to connect to the vehicle 140 and capture stored information collected by sensors of vehicle 140. The captured vehicle information may include a log of accelerometer data, a log of speed data, a log of position data (e.g., GPS coordinates), a log of braking data, other telematics data, video or images captured by cameras of the vehicle 140, and other such data that may contain information about the incident.

In some examples, the mobile estimate application 153 may also cause the mobile system 150 to collect stored information collected by sensors of vehicle 160, which may be another vehicle that was involved in the incident or that was nearby the incident (e.g., that may have recorded images or video of the incident). The owner, driver, or other user of vehicle 160 may provide authorization credentials to mobile system 150, which a user of the mobile system 150 may input (e.g., to mobile estimate application 153) to enable mobile system 150 to communicate with and capture data from vehicle 160. The captured vehicle information may include a log of accelerometer data, a log of speed data, a log of position data (e.g., GPS coordinates), a log of braking data, other telematics data, video or images captured by cameras of the vehicle 160, and other such data that may contain information about the incident. A user of mobile system 150 may repeat this process with any number of vehicles that were involved or nearby (e.g., within a threshold distance of) the incident.

At step 203, the mobile system 150 may capture a walk-around video of the vehicle 140. For example, the mobile estimate application 153 may prompt a user to point a camera at the vehicle and walk around it while recording a video. The mobile estimate application 153 may provide user interfaces with instructions indicating how to capture the video. The instructions may indicate that the user should capture a 360° walk-around video (e.g., by circling the entire vehicle).

Figure 3A:
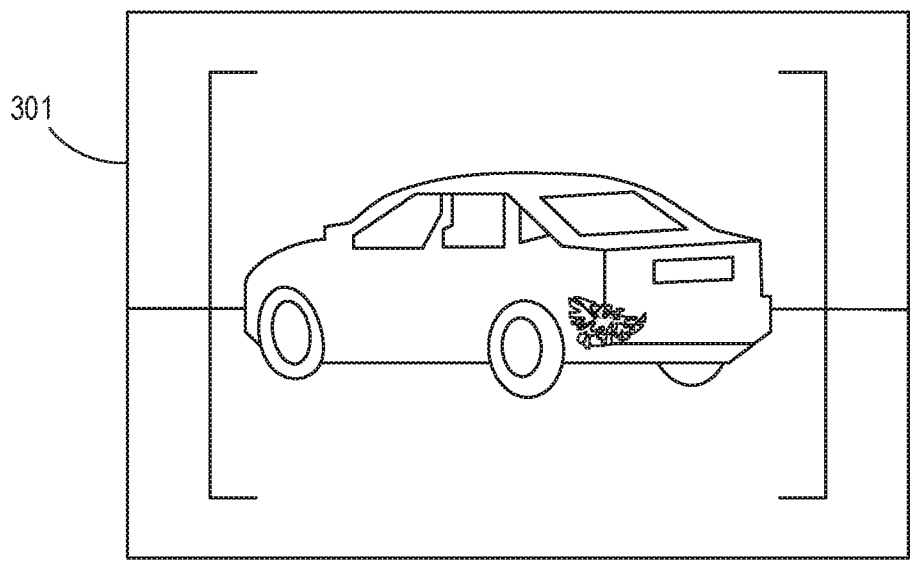
FIGS. 3A-3B depict example graphical user interfaces that may be used by methods or systems for analyzing images and videos of damaged vehicles in accordance with one or more example embodiments.
Figure 3B:
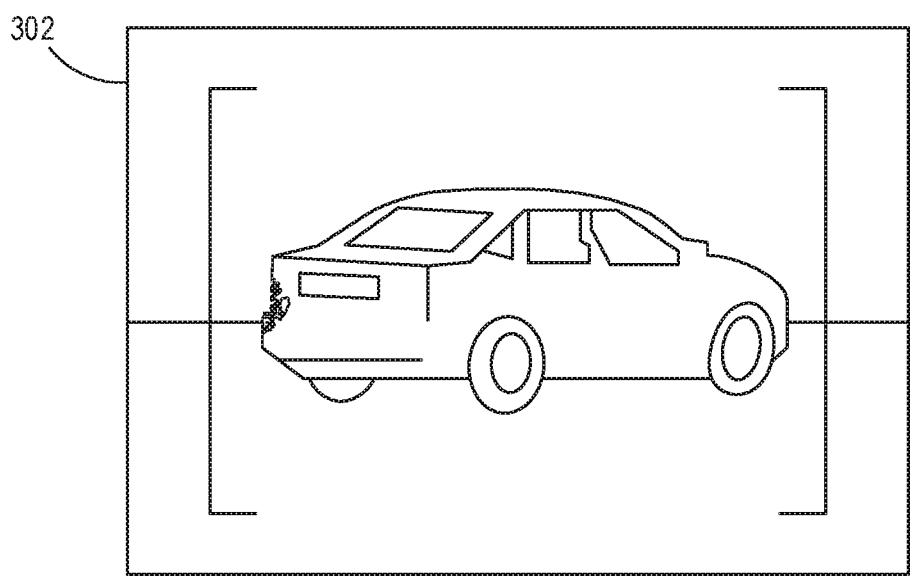

Turning to FIG. 3A, the mobile estimate application 153 may cause display of an example user interface 301 that includes brackets overlaid on live video captured by the mobile system 150. The mobile estimate application 153 may instruct the user to keep the vehicle within the brackets as the user walks around the vehicle while recording a video. As illustrated by the user interface 302 of FIG. 3B, the brackets may remain overlaid on the user interface to assist the user in framing the vehicle and/or damaged part of the vehicle as the user walks around the vehicle. The captured walk-around video may omit the brackets or other user interface elements, which may be displayed to assist the user during capture of the video.

The mobile estimate application 153 may instruct the user to include the entire vehicle within the illustrated brackets and/or may instruct the user to stay closer to the vehicle such that the entire vehicle does not fit within the brackets. In some embodiments, the mobile estimate application 153 may instruct the user to capture multiple walk-around videos from various distances.

The mobile estimate application 153 may store the captured video (e.g., in application database 154) and/or transmit the captured video (e.g., by streaming) to a network location. In some examples, the captured video may be transmitted to damage detection computing platform 110 without being stored in long-term storage of the mobile device 150 (e.g., without being stored in application database 154).

Instead of or in addition to capturing a 360° walk-around video, the mobile estimate application 153 may calculate and determine that a user should capture a walk-around video focusing on specific portions of the vehicle 140. The mobile estimate application 153 may determine which portions to focus on based on the information gathered at step 202. The mobile estimate application 153 may automatically determine one or more likely impact points (which may correspond to damage) based on the captured information. For example, the mobile estimate application 153 may analyze the accelerometer data captured from vehicle 140 and/or vehicle 160 to detect sudden spikes of acceleration and a corresponding direction, which may indicate an impact point (e.g., a sudden acceleration to the left by vehicle 140 may indicate an impact on the right side of the vehicle). As another example, the mobile estimate application 153 may analyze the location data captured from vehicle 140 and/or 160 to detect an impact point (e.g., if vehicles 140 and 160 were headed towards each other before a collision, the impact point is likely at the front of both vehicles). As another example, the mobile estimate application 153 may analyze readings from impact sensors, airbag deployment sensors, and the like, which may indicate a time of impact, and then analyze location and/or accelerometer data corresponding to the determined time of impact to determine a likely impact point. As another example, the mobile estimate application 153 may analyze video or images that show a vehicle approaching from a specific direction and/or LIDAR, radar, sonar, or other distance and direction information that indicates an approaching vehicle, which may indicate an impact point. In some embodiments, mobile estimate application 153 may cause the vehicle information to be uploaded to damage detection computing platform 110, which may determine one or more likely impact points and transmit such a determination back to mobile system 150.

Then, the mobile estimate application 153 may instruct the user to capture a walk-around video focusing on the impact point(s). For example, if a likely impact point is on the right side of the vehicle, the mobile estimate application 153 may instruct the user to capture a walk-around video of the right side of the vehicle. Additionally or alternatively, the mobile estimate application 153 may instruct the user to record a walk-around video of whatever portion visually appears damaged to the user.

Figure 4:
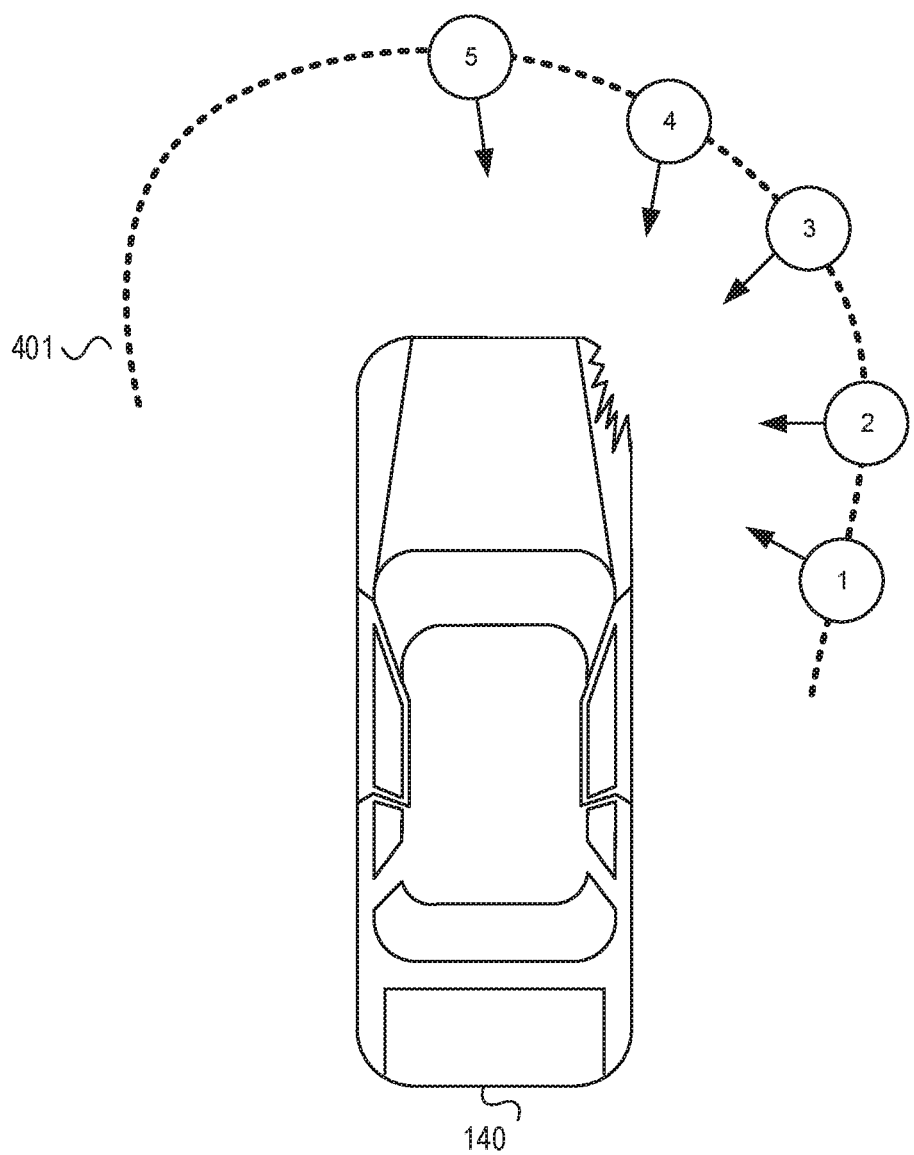
FIGS. 4 & 5 depict illustrative views of vehicles and captured images of vehicles that may be used by methods or systems for analyzing images and videos of damaged vehicles in accordance with one or more example embodiments.

The mobile estimate application 153 may further instruct a user to capture a portion of the vehicle that is symmetrical to the damaged portion. For example, as illustrated at FIG. 4, if the detected impact point is the right front corner of the vehicle, the mobile estimate application 153 may instruct the user to capture both the right front corner and the left front corner in the walk-around video. The user may thus follow a path 401 while recording the walk-around video. By including symmetrical portions of the vehicle 140 in the walk-around video, the damage detection computing platform 110 may have an improved ability to detect the extent of damage to the vehicle 140 by detecting asymmetries, as will be further discussed below.

In some examples, the mobile estimate application 153 may store and execute quality assurance algorithms that detect whether the captured videos include images of a vehicle (e.g., using object recognition models such as neural networks), have acceptable quality lighting, as well as other quality assurance analyses. During or after the mobile estimate application 153 captures the walk-around video(s), the mobile estimate application 153 may analyze frames of the video to provide feedback to the user on how to capture and/or recapture the walk-around video (or certain portions of the walk-around video). For example, if the mobile estimate application 153 analyzes a frame of video using object recognition and does not detect a vehicle, the mobile estimate application 153 may provide a warning or alert to the user.

Accordingly, the mobile estimate application 153 may analyze one or more frames of the captured video using an object recognition model 155 (as referred to in FIG. 1C). The object recognition model 155 may be trained using a training data set comprising images of vehicles (e.g., in various lighting conditions and at various angles and orientations). The object recognition model 155 may be trained to map a representation of an input image to an output variable indicating whether the image contains a vehicle and/or a confidence score. The object recognition model 155 may be a neural network or some other machine-learning or statistical model.

The mobile estimate application 153 may convert each analyzed frame of video to an input in a format usable by object recognition model 155 (e.g., an input array or matrix of floating point numbers, each representing one or more pixels of the image). The mobile estimate application 153 may convert some or all of the frames of the walk-around video(s) to be inputs to the object recognition model 155. The mobile estimate application 153 may run the object recognition model 155 on the formatted input for each image to generate an indication of whether the image contains a vehicle, and a confidence score. The mobile estimate application 153 may determine that the image contains a vehicle if the confidence score is above a minimum threshold.

If the object recognition model 155 indicates that the frame does not contain a vehicle, the mobile estimate application 153 may attempt to determine a reason. For example, the mobile estimate application 153 may analyze brightness information of the frame to determine if the frame is too dark. If the frame is too dark, the mobile estimate application 153 may cause a light of the mobile system 150 to turn on and/or display a warning requesting the user to turn the light on. As another example, the mobile estimate application 153 may determine, using accelerometer, compass, and/or gyroscope data captured by sensors 157 of the mobile system 150, that a user walked forward and therefore may be too close to the vehicle. In response, the mobile estimate application 153 may display a warning indicating that the user should back away from the vehicle. As a third example, the mobile estimate application 153 may determine, based on accelerometer, compass, and/or gyroscope data of mobile system 150, that a user rotated the mobile system 150, and display a warning instructing the user to rotate the mobile system 150 in the opposite direction.

The mobile estimate application 153 may perform the object recognition and display of warnings in real-time or near-real-time as the user is capturing the walk-around video(s), so that the user may correct any problems before concluding the recording of a walk-around video. Additionally or alternatively, the mobile estimate application 153 may perform the detection of errors after concluding recording of a walk-around video, and may play back the portions of the video associated with the warnings to the user of mobile system 150 so that the user can re-capture the relevant portions of the walk-around video(s).

To reduce processing requirements, the mobile estimate application 153 may perform quality assurance on only portions of the captured walk-around video(s). For example, the mobile estimate application 153 may input only some captured frames (e.g., two per second) to the object recognition model 155. If the object recognition model 155 does not detect a vehicle in one or more of the frames, it may further analyze additional frames to determine whether the walk-around video (or a portion of the walk-around video) needs to be recaptured. For example, the mobile estimate application 153, after analyzing the additional frames, may determine start and end timestamps for a portion of the video that should be recaptured and play back the portion of the walk-around video indicated by the timestamps for the user, so that the user may recapture the corresponding portion of the walk-around video.

In some examples, instead of or in addition to performing object recognition at the mobile system 150, the damage detection computing platform 110 may store and/or execute an object recognition model 116A (as referred to in FIG. 1B) and/or other algorithms used for quality assurance. Therefore, at step 204, the mobile estimate application 153 may upload one or more frames of the walk-around video to the damage detection computing platform 110, which may analyze the one or more frames using the object recognition model 116A to perform a quality assurance process as described above. As part of the quality assurance process, the damage detection computing platform may transmit, back to the mobile system 150, one or more indications of whether a vehicle is detected in the frame, whether the lighting is insufficient or unacceptable (e.g., too dark, too bright, etc.), and other such quality determinations, so that the mobile device 150 may display warnings for adjusting the position and/or settings of mobile system 150 or for re-capturing relevant portions of a walk-around video.

To reduce upload bandwidth requirements, the damage detection computing platform 110 may perform quality assurance on only portions of the captured walk-around video(s). For example, the mobile estimate application 153 may cause the mobile system 150 to upload only some frames (e.g., one per second) of the captured walk-around video to the damage detection computing platform 110. If the damage detection computing platform 110 fails to detect a vehicle in one or more of the frames, it may send a request that causes the mobile system 150 to upload additional frames (e.g., all of the captured frames within 0.5 seconds of the one or more frames with quality issues). The damage detection computing platform 110 may then analyze the additional frames to determine whether the walk-around video (or a portion of the walk-around video) needs to be recaptured. For example, the damage detection computing platform 110 may determine start and end timestamps for a portion of the video that should be recaptured and transmit the timestamps back to the mobile system 150. The mobile system 150 may then play back the portion of the walk-around video indicated by the timestamps for the user, so that the user may recapture the corresponding portion of the walk-around video.

In some examples, a human adjuster may assist with the quality assurance process. For example, the damage detection computing platform 110 may send video portions and/or frames to the claims adjuster system 120 to verify if the some or all of the walk-around videos need to be retaken and for what reason. A claims adjuster at the claims adjuster system may provide feedback confirming any quality problems and indicating the reason for the problems (e.g., too dark, too bright, too far away from the vehicle, too close to the vehicle, etc.), whereupon the claims adjuster system 120 may transmit such feedback to the mobile system 150 so that the user may recapture some or all of the walk-around videos.

Figure 2B:
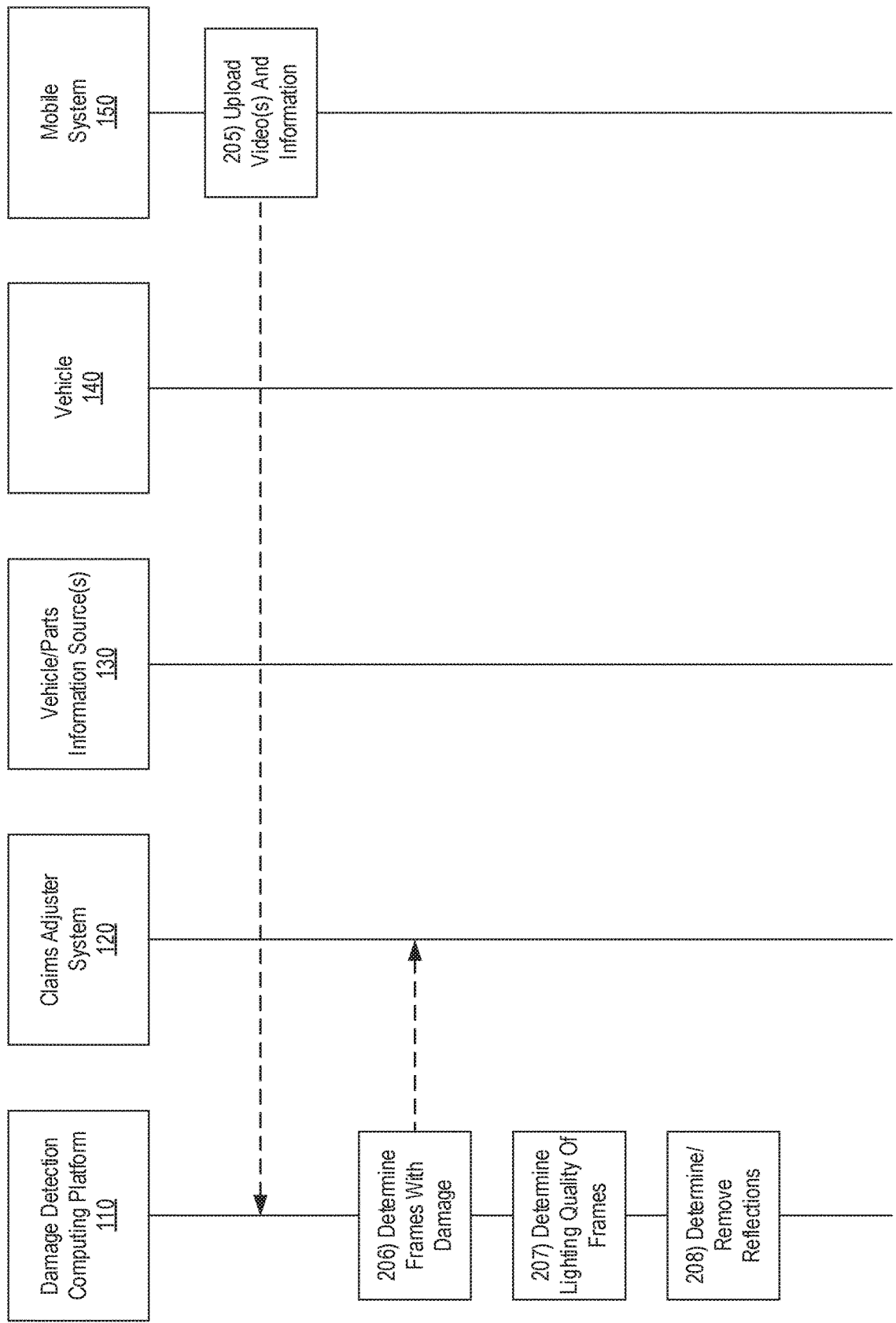

Turning to FIG. 2B, at step 205, responsive to completion of the quality assurance process, the mobile system 150 may upload some or all of the one or more walk-around video(s) and additional information to damage detection computing platform 110. The additional information may include some or all of the vehicle information captured at step 202, information derived from the vehicle information (such as a likely impact point), vehicle identification information such as make/model/year and/or VIN, and the like.

In some examples, the damage detection computing platform 110 may retrieve the additional information (e.g., sensor information and other information from vehicles 140 and/or 160) via a separate communication path. For example, if mobile system 150 did not collect vehicle information from one or more vehicles involved in the incident, the damage detection computing platform 110 may send queries to one or more vehicles for information associated with the incident. The queries may include a time of the incident, which may be calculated based on other vehicle sensor information, sensor information received from the mobile system 150, and/or estimated based on a time at which a user selected an incident reporting option at step 201. The vehicles may then respond with the appropriate sensor information, image and video information, and other such vehicle information based on the time specified in the query.

At step 206, the damage detection computing platform 110 may use image analysis techniques to determine which frames of the video show damage to the vehicle, which may beneficially allow the damage detection computing platform 110 and/or claims adjuster system 120 to focus further analysis on the frames showing damage. By analyzing some or all frames of the video for damage using a damage model 116B (as referred to in FIG. 1B), the damage detection computing platform 110 may generate tags that indicate which portions of video contain damage. The damage detection computing platform 110 may generate one or more tags comprising starting and ending timestamps that indicate which segments of the video contain damage.

The damage model 116B may be trained using a training data set comprising images of both damaged and undamaged vehicle parts or components, damaged and undamaged vehicle materials such as sheet metal, glass, or plastics, and other such images related to vehicle damage. The training data set may further include a target variable that indicates the presence of damage or no damage in each image (e.g., a binary variable) and/or the extent of damage in each image (e.g., a continuous variable indicating the extent of damage and/or a variable indicating a discrete category of damage such as mild, moderate, severe, etc.). In some examples, the training data set may additionally include an indication of which portion of the training image contains damage. The damage model 116B may be trained to map a representation of an input image to one or more output variables indicating the presence of damage, the extent of damage, and/or the location of damage. The damage model 116B may be a neural network or some other machine-learning or statistical model.

The damage detection computing platform 110 may convert each input image to a format usable by the damage model 116B (e.g., an input array or matrix of floating point numbers, each representing one or more pixels of the image). The damage detection computing platform 110 may convert some or all of the frames of the walk-around video(s) to be inputs to the damage model 116B. The damage detection computing platform 110 may run the damage model 116B on the formatted input to generate a damage prediction, and tag the corresponding walk-around video frame with the damage prediction. The damage detection computing platform 110 may then generate one or more tags indicating which frames and/or segments of the walk-around video(s) contain damage.

In some examples, the damage model 116B may indicate which portions of an image contain damage. In these examples, the damage detection computing platform 110 may tag each analyzed frame with an indication of which portion of the frame contains damage.

In some examples, the tags indicating which frames and/or segments of the video(s) contain damage and/or which portions of each frame includes damage may be sent to a claims adjuster system 120. A claims adjuster may review the corresponding frames and/or video containing damage in order to generate a manual estimate of the cost of repairing the vehicle.

At step 207, the damage detection computing platform 110 may determine the lighting quality of the frames of the walk-around video(s). Frames with better lighting quality may provide for more accurate analysis of which specific parts are damaged and the extent of the damage. The damage detection computing platform 110 may analyze image factors such as the maximum luma value of the frame, the minimum luma value of the frame, an average luma value of the frame, color information, and other such information in order to determine whether the frame is too dark or too bright (e.g., such that detail is lost). In some examples, the damage detection computing platform 110 may adjust luma and/or color values of one or more frames of the video in order to improve manual or automatic analysis.

At step 208, the damage detection computing platform 110 may determine which frames contain reflections. Reflections may interfere with the damage analysis, extent of damage analysis, or other image analyses. Reflections may appear as a first image component overlaid on a second image component. When a camera's viewpoint changes, the first image component may appear (to the camera) to shift in one direction while the second (reflected) image component appears to shift in another direction.

To detect reflections, the damage detection computing platform 110 may compare a frame to one or more preceding frames and/or one or more following frames of a video. The damage detection computing platform 110 may detect features of a frame and observe that one particular feature moves in one direction over time, while another particular feature moves in a different direction over time. To detect features of a frame, the damage detection computing platform 110 may break down frames into arrays or matrices containing information about one or more portions of the image. Then the damage detection computing platform 110 may find similar arrays or matrices in a preceding or following frame, and generate a motion vector indicating how the image portion moved between the frames. The damage detection computing platform 110 may thus detect how image features move over time. When the damage detection computing platform 110 determines that some portions of a frame move in a first direction whereas other (overlaid) portions of the frame move in a second direction, it may detect a reflection. In some examples, the damage detection computing platform 110 may only determine a reflection if the first and second motion vectors differ by at least a threshold magnitude and/or angle.

Depending on aspects of the image features that move in different directions, the damage detection computing platform 110 may determine the extent of the reflection. For example, the damage detection computing platform 110 may characterize the size of the reflection (e.g., small, medium, large), the location of the reflection within the frame, the brightness of the reflection, the color of the reflection, and the like. The damage detection computing platform 110 may also determine whether the reflection overlaps with the portion of the frame containing damage. The damage detection computing platform 110 may tag the corresponding frame with such information characterizing the reflection.

In some examples, the damage detection computing platform 110 may remove the image information associated with the reflection. The damage detection computing platform 110 may detect that most of the image moves according to a first motion vector, and only portions of the image move according to a second motion vector. Accordingly, the damage detection computing platform 110 may remove the portions of the frame associated with the second motion vector. The damage detection computing platform 110 may remove the reflection by adjusting the portion of the frame containing a reflection based on the values of corresponding portions of preceding and following frames, which may contain the reflection at a different location.

Turning to FIG. 2C, at step 209, the damage detection computing platform 110 may determine which frames include occlusions. Occlusions are objects that appear between the video camera and the vehicle, thus blocking the view of some or all of the vehicle. Occlusions may appear as a first image portion that moves according to a first motion vector while a second image portion moves according to a second motion vector. As compared to reflections, the first and second image portions do not overlap because the occluding object blocks the view of the vehicle (e.g., unless the occluding object is transparent).

To detect occlusions, the damage detection computing platform 110 may again compare image features of a frame with corresponding image features of one or more preceding frames and/or one or more following frames. Thus, the damage detection computing platform 110 may break down frame into arrays or matrices containing information about one or more portions of the image. Then the damage detection computing platform 110 may find similar arrays or matrices in a preceding or following frame, and generate a motion vector indicating how the image portion moved between the frames. The damage detection computing platform 110 may thus detect how image features move over time. When the damage detection computing platform 110 determines that some portions of a frame move according to a first motion vector whereas other (non-overlapping) portions of the frame move according to a second motion vector, it may detect an occlusion. In some examples, the damage detection computing platform 110 may only determine an occlusion if the first and second motion vectors differ by at least a threshold magnitude and/or angle.

The damage detection computing platform 110 may further determine the extent of the occlusion. For example, the damage detection computing platform 110 may characterize the size of the occlusion (e.g., small, medium, large) and/or the location of the occlusion within the frame. The damage detection computing platform 110 may tag the corresponding frame with such information characterizing the occlusion.

Figure 5:
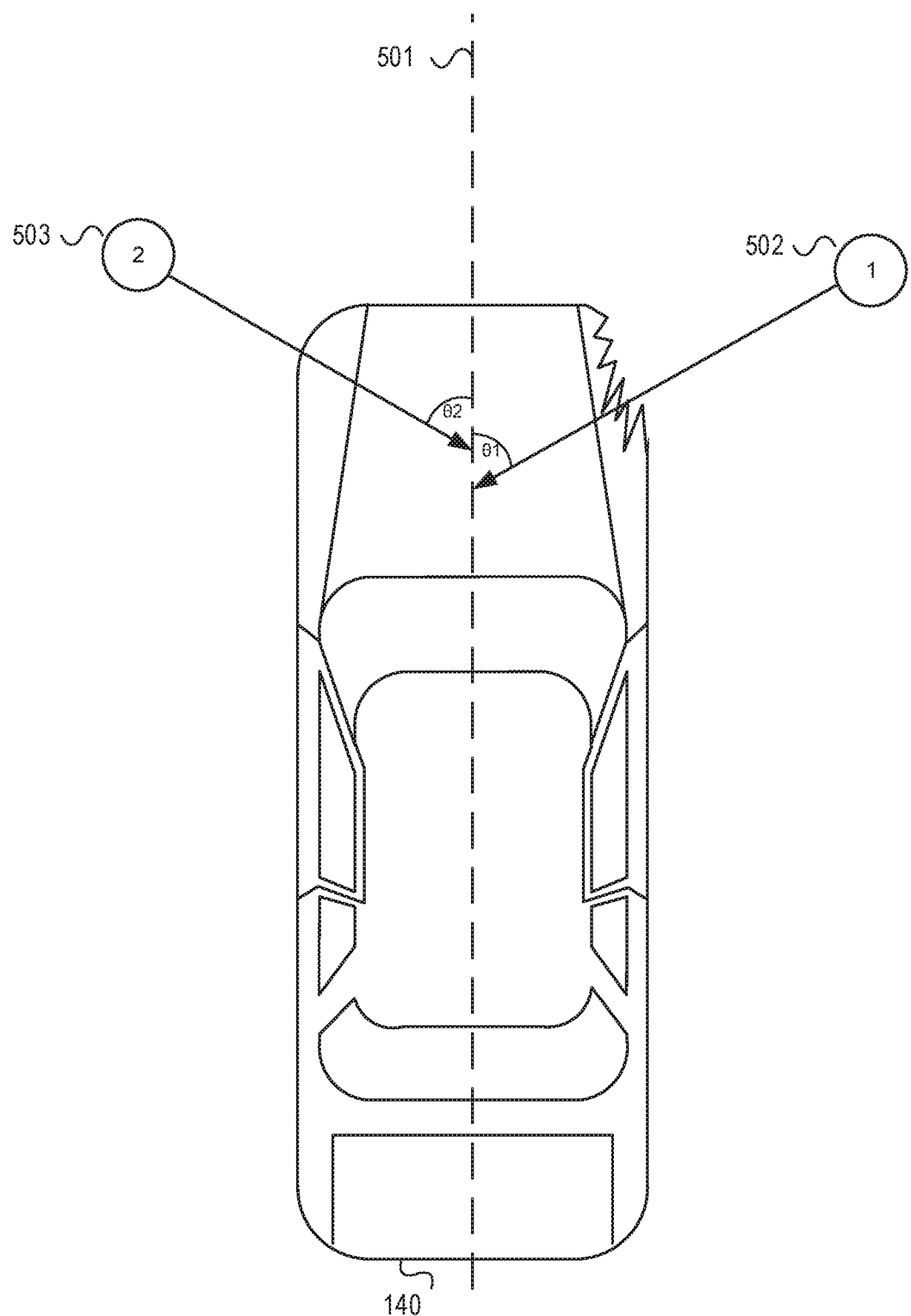

At step 210, the damage detection computing platform 110 may determine an angle and/or location of one or more frames of the video with respect to the vehicle. Turning briefly to FIG. 5, positions and directions of example first and second frames of video are illustrated. A first frame of video was captured at a first location 502 while facing toward the front right corner of the vehicle, and a second frame of video was captured at a location 503 while facing toward the front left corner of the vehicle. The angle and/or location of each frame may be determined with respect to a line of symmetry 501 that bisects the vehicle. For example, the first frame may be associated with an angle of θ1 degrees (e.g., 31 degrees), whereas the second frame may be associated with an angle of −θ2 degrees (e.g., −33 degrees). Each frame's location may be characterized by coordinates based on estimated distance from the vehicle.

The damage detection computing platform 110 may determine the angle and/or location with respect to the vehicle of each frame using an angle model 116C (as referred to in FIG. 1B). The angle model 116 may be trained using a training data set comprising images of vehicles from various angles. The training data set may further include one or more target variables that indicate the angle and location (e.g., using coordinates) of each image (e.g., with respect to a line of symmetry). The angle model 116 may be trained to map a representation of an input image to one or more output variables indicating the angle and/or location. The angle model 116C may be a neural network or some other machine-learning or statistical model.

The damage detection computing platform 110 may convert each image to be analyzed to an input in a format usable by the angle model 116C (e.g., an input array or matrix of floating point numbers, each representing one or more pixels of the image). The damage detection computing platform 110 may convert some or all of the frames of the walk-around video(s) to be inputs to the angle model 116C. The damage detection computing platform 110 may run the angle model 116C on the formatted input for each image to generate an angle and/or location prediction for each image, and tag the corresponding walk-around video frame with the angle and/or location.

At step 211, the damage detection computing platform 110 may select one or more frames of the video as being representative of the damaged portion of the vehicle for further analysis of the damaged vehicle. By selecting a limited number of representative frames, the damage detection computing platform 110 may be able to more efficiently perform more resource-intensive analyses including a detailed analysis of which parts cluster is damaged and/or a detailed analysis of vehicle asymmetries. Providing a limited number of representative frames may also assist claim adjusters to provide faster review of the damaged vehicle during spot checking of the automatic damage analysis and/or during a manual estimate process.

In some examples, the damage detection computing platform 110 may select the representative images by filtering out frames that do not show damage as determined at step 206, frames with insufficient or unacceptable lighting as determined at step 207, frames with reflections as determined at step 208, and frames with occlusions as determined at step 209. In some cases, the damage detection computing platform 110 may not filter out frames that have small reflections or small occlusions. For example, if a reflection is characterized as "small" and/or does not overlap with the damaged portion of the frame, the frame may not be filtered out. Similarly, if the occlusion is small and not nearby the damaged portion of the frame, the frame may not be filtered out. Therefore, the associated tags characterizing the reflection and/or occlusion in each frame may be compared to one or more criteria to determine whether to filter out the frame.

Of the remaining frames after filtering, the damage detection computing platform 110 may select representative images of various angles. Turning to FIG. 4, after filtering out frames that do not show damage, with insufficient or unacceptable lighting, with reflections, and with occlusions, five frames may be left. The five frames may have been taken at various points on the path 401 taken by the mobile system 150 while capturing the walk-around video. For example, the damage detection computing platform may select frames 1, 3, and 5 as the representative images based on their associated angle data. In this example, frames 2 and 4 may not be selected as representative images because their associated angles are close to those of other frames (e.g., the angle of frame 2 may be within a threshold amount of the angle of frame 1, and the angle of frame 4 may be within a threshold amount of the angle of frame 3).

In some examples, instead of or in addition to using filtering, the damage detection computing platform 110 may use an image selection model 116D (as referred to in FIG. 1B) to select one or more frames as representative images based on a relevance criterion. The image selection model 116D may be trained using a training data set comprising images of damaged vehicles (e.g., from previous claims). In some examples, the training data set may also include motion vector data (which may be generated as described for steps 208 or 209). The training data set may further include a target variable that indicates whether the image was relevant or not and/or a relevance score. The image selection model 116D may be trained to map a representation of an input image to an output variable indicating a relevance determination and/or score.

The damage detection computing platform 110 may convert one or more frames of the walk-around video to an input in a format usable by the image selection model 116D (e.g., an input array or matrix of floating point numbers, each representing one or more pixels of the image). The damage detection computing platform 110 may then run the image selection model 116D on the inputs (as well as any additional input data, such as motion vector data generated at steps 208 and/or 209) in turn to determine which frames are relevant.

If the image selection model 116D predicts a relevance score, the damage detection computing platform 110 may rank the images based on their relevance scores, then use a ranking cutoff (e.g., the top 50 scoring images) and/or score cutoff (e.g., any image with a relevance score of at least 0.7 on a 0-1 scale) to determine which images are most relevant. Then, from the most relevant images, the damage detection computing platform 110 may select images of various angles as the representative images, as described above with respect to FIG. 4.

The damage detection computing platform 110 may transmit the selected representative images to the claims adjuster system 120. A claims adjuster may use the representative images to manually determine a settlement cost, which may be used in addition to or as an alternative to an automatic estimate. Additionally or alternatively, the claims adjuster may review the representative images to provide feedback on the automatic analyses performed by damage detection computing platform 110, as will be further discussed below.

At step 212, the damage detection computing platform 110 may select additional frames that show symmetrical portions of the damaged portion of vehicle 140. By comparing a frame containing a damaged portion of the vehicle (e.g., a damaged left door) with a frame containing an undamaged symmetrical portion of the vehicle (e.g., an undamaged right door), the damage detection computing platform 110 may determine asymmetry information that indicates one or more damaged parts clusters and/or an extent of damage to the parts clusters.

The damage detection computing platform 110 may find symmetrical images for each representative image. For example, turning to FIG. 5, a first frame may be a representative image of the damaged front right corner. The first frame may be associated with a first angle θ1. The damage detection computing platform 110 may find a second frame of the video that shows the undamaged left front corner. The second frame may be associated with a symmetrical angle and/or location such that the views from the first frame and the second frame are symmetrical. In the illustrated example, the damage detection computing platform 110 may find that the second frame is a closest symmetrical match to the first frame based on the first location and/or first angle of the first frame. The damage detection computing platform 110 may determine that the second frame is the closest symmetrical match based on the difference between the absolute value (e.g., ignoring differences in sign) of the angles and/or locations of the first and second frames. In some examples, the damage detection computing platform may only use a symmetrical image that has an angle or position that is within a threshold angle difference or distance of the first frame.

The damage detection computing platform 110 may analyze whether the symmetrical images contain insufficient or unacceptable lighting, reflections, or occlusions (e.g., as determined at steps 207, 208, and 209). If any of the symmetrical images contain bad lighting, reflections, or occlusions, the damage detection computing platform 110 may avoid determining asymmetry information for the corresponding pair of images.

With reference to FIG. 2D, at step 213, the damage detection computing platform 110 may then compare the representative images of damaged portions of vehicle 140 with their corresponding symmetrical images (that do not contain bad lighting, reflections, or occlusions) to generate asymmetry data. The damage detection computing platform 110 may first flip the symmetrical image (e.g., horizontally so that a left door appears as a right door). The damage detection computing platform 110 may further normalize brightness and color information so that both images appear to have similar brightness levels, color saturation, color balance, white balance, and the like. In some examples, the damage detection computing platform 110 may convert both images to grayscale before performing the comparison.

The damage detection computing platform 110 may then select one or more feature points on the representative image and locate matching feature points on the symmetrical image. For example, one feature point may correspond to a corner of the door on both images. The damage detection computing platform 110 may warp the symmetrical image so that the feature points line up (e.g., by skewing, enlarging, shrinking, rotating, or otherwise adjusting the symmetrical image until the feature points line up) and the images can be directly compared. The damage detection computing platform 110 may further crop the non-overlapping parts of the images before performing the comparison.

The damage detection computing platform 110 may generate an asymmetry array or matrix representing the asymmetry. The asymmetry array or matrix may be generated by directly comparing the normalized representative image to the normalized, flipped, warped, and/or cropped symmetrical image in order to generate differential data (e.g., using a subtraction operation). The asymmetry array or matrix may thus indicate the differences between the images, which may be indicative of asymmetries. The damage detection computing platform 110 may further determine a magnitude of the asymmetry by summing up the absolute values of each element of the asymmetry array or matrix.

In some cases, the damage detection computing platform 110 may generate asymmetry information corresponding to the entire vehicle and/or to a large portion of the vehicle. For example, the damage detection computing platform 110 may compare a zoomed out image showing the entirety (or majority) of the left side of the vehicle to a zoomed out image showing the entirety (or majority) of the right side of the vehicle in order to generate asymmetry information for the corresponding sides of the vehicles. Additionally or alternatively, the damage detection computing platform 110 may compare only the image portion associated with damage and a corresponding portion of the symmetrical image. For example, the damage detection computing platform 110 may extract a portion of an image showing a damaged right headlight and compare it to a portion of an image of an undamaged left headlight in order to generate asymmetry information characterizing the damaged portion.

In some embodiments, the pair of images may be associated with depth information (e.g., if the mobile system 150 has multiple cameras capable of capturing images with depth information). The damage detection computing platform 110 may compare the depth information in addition to or as an alternative to comparing the image information. The depth information may be similarly flipped and warped before comparison to generate the asymmetry information.

At step 214, the damage detection computing platform 110 may retrieve additional data that indicates the extent of damage to the vehicle. For example, the damage detection computing platform 110 may receive sensor, telematics, video, images, and other such data from vehicle 140 and/or vehicle 160 if damage detection computing platform 110 has not yet received such information. In other examples, the damage detection computing platform 110 may receive an indication of an impact point generated by a claims adjuster and transmitted by claims adjuster system 120.

The damage detection computing platform 110 may then determine one or more damaged parts clusters using a parts cluster damage model 116E (as referred to in FIG. 1B). The parts cluster damage model 116E may be used to detect damage to one or more vehicle-independent parts clusters. Vehicles may generally consist of a number of parts clusters. For example, most vehicles typically contain parts clusters such as a left front door, a right front door, a left rear door, a right rear door, a front bumper, a rear bumper, a left headlamp, a right headlamp, a left tail lamp, and so on.

The parts cluster damage model 116E may be trained using a training data set comprising one or more of asymmetry data (e.g., asymmetry arrays or matrices and/or magnitudes of the asymmetries), vehicle damage information (e.g., accelerometer data, crash sensor data, other telematics data, impact point, etc.), and/or representative images of damage. The training data set may further include a target variable that indicates which parts clusters are damaged and optionally an extent of damage for each parts cluster. The parts cluster damage model 116E may be trained to map the input data to an output array indicating whether each parts cluster is damaged or not (e.g., the array may contain binary indicators) and/or an extent of damage of each parts cluster (e.g., the array may contain a continuous damage score and/or one or more categories of damage, such as none, mild, moderate, severe, etc.).

The damage detection computing platform 110 may input the asymmetry data (e.g., asymmetry arrays or matrices and/or magnitude of the asymmetry), vehicle damage information, and/or representative images of damage (which may be converted into an input format usable by the model) to the parts cluster damage model 116E in order to determine which parts clusters are damaged and/or the extent of damage.

At step 216, based on the parts cluster damage information, the damage detection computing platform 110 may determine a repair/replace decision. For example, if one or more parts clusters are associated with a "severe" damage indication, the damage detection computing platform 110 may determine that the corresponding parts should be replaced, whereas parts associated with a "mild" damage indication may be associated with a repair decision.

The damage detection computing platform 110 may also determine a repair/replace decision based on the asymmetry information (e.g., the asymmetry array or matrix and/or the magnitude of the asymmetry array or matrix) in addition to or instead of the extent of damage information. For example, if the damage detection computing platform 110 detects that two portions of a vehicle have less than a first threshold amount of asymmetry, the damage detection computing platform 110 may determine that there is no damage to the corresponding parts. If the damage detection computing platform 110 detects that two portions of a vehicle have more than a first threshold amount of asymmetry, but less than a second threshold amount of asymmetry, the damage detection computing platform 110 may determine that the corresponding parts should be repaired. If the damage detection computing platform 110 detects that two portions of a vehicle have more than a second threshold amount of asymmetry, the damage detection computing platform 110 may determine that the corresponding parts should be replaced.

In some examples, the damage detection computing platform 110 may use a repair/replace model 116F (as referred to in FIG. 1B) to determine whether a parts cluster needs to be repaired or replaced. Different repair/replace models 116F may be trained for each parts cluster (or type of parts cluster). For example, a first repair/replace model 116F may be trained for a right front door (or any door), a second repair/replace model 116F may be trained for a front bumper (or both bumpers), and the like.

The one or more repair/replace models 116F may be trained using a training data set comprising one or more of asymmetry data (e.g., asymmetry arrays or matrices and/or magnitude of the asymmetry) corresponding to the relevant parts cluster, vehicle damage information (e.g., accelerometer data, crash sensor data, other telematics data, impact point, etc.), and/or representative images of damage to the relevant parts cluster. The training data set may further include a target variable that indicates repair/replace decisions for the relevant parts cluster. The repair/replace models 116F may be trained to map the input data to an output variable indicating whether the relevant parts cluster needs to be replaced or not.

The damage detection computing platform 110 may input the asymmetry data (e.g., asymmetry arrays or matrices and/or magnitude of the asymmetry), vehicle damage information, and/or representative images of damage (which may be converted into an input format usable by the model) to the relevant repair/replace model 116F in order to determine whether the corresponding parts cluster should be repaired or replaced. The damage detection computing platform 110 may repeat this process for each parts cluster that is damaged using its corresponding repair/replace model 116F.

Figure 2E:
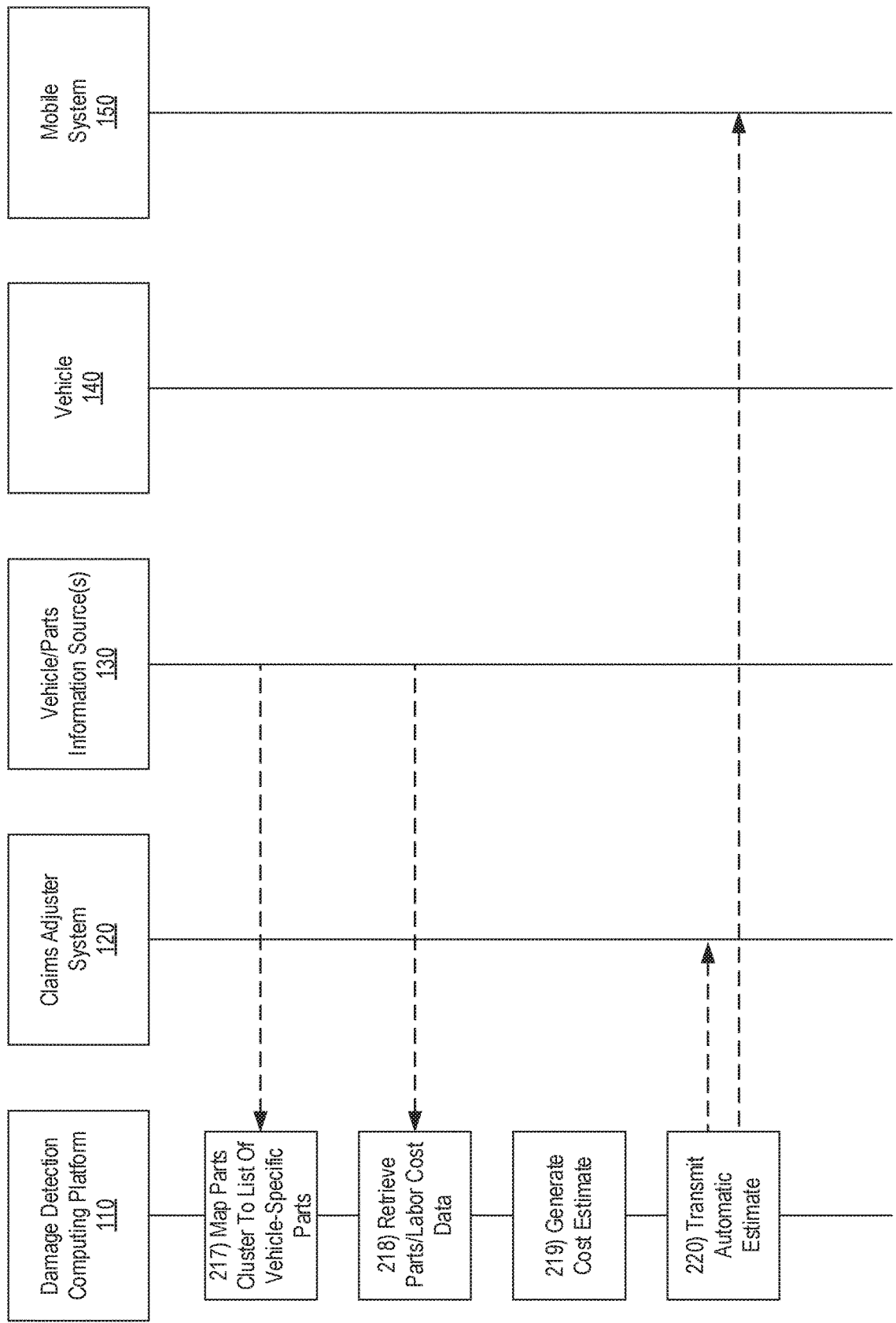

Referring to FIG. 2E, at step 217, the damage detection computing platform 110, after determining repair/replace decisions for the parts clusters, may map the parts clusters associated with replace decisions to a list of vehicle-specific parts (e.g., to determine parts that need to be purchased to repair the vehicle). As part of this process, the damage detection computing platform 110 may request and receive parts information from one or more vehicle/parts information source(s) 130. The query may contain vehicle information, such a make/model/year of the vehicle, a VIN of the vehicle, or the like that may be used to determine vehicle-specific parts information. In some examples, mappings of vehicle-specific parts to parts clusters may be stored in database 115 of damage detection computing platform 110, and the damage detection computing platform 110 may query the database using the associated parts cluster and vehicle identification information to determine the list of vehicle-specific parts.

After retrieving the list of parts for repair or replacement, at step 218, the damage detection computing platform 110 may further retrieve parts cost data for each of the parts that need to be purchased. The damage detection computing platform 110 may send one or more queries to one or more vehicle/parts information source(s) 130 to determine cost data for each part. Because cost data may vary by location, the queries may contain a location, and/or may be sent to sources of parts in a location nearby the user of mobile system 150. In some examples, the damage detection computing platform 110 may query databases of used parts for sale in order to determine if the part may be purchased for less than full price. The databases of used parts may contain information about local junkyards, resale shops, and the like that are nearby the user's location and/or a local repair shop. In some examples, the parts cost and/or used parts availability information may be stored in a database 115 of damage detection computing platform 110.

The damage detection computing platform 110 may further retrieve labor cost data. The damage detection computing platform 110 may query information source(s) 130 that contain information about local labor rates and/or may query local repair shops for labor information. In some examples, the labor rate information may be stored in a database 115 of damage detection computing platform 110.

At step 219, the damage detection computing platform 110 may generate a cost estimate for repairing the vehicle 140. The cost estimate may include a cost of the parts that need to be purchased and a cost of labor for repairing and replacing the parts. The damage detection computing platform 110 may determine an amount of labor needed to perform the repair or replacement of each damaged parts cluster based on labor information stored in database 115 of damage detection computing platform 110. For example, a repair decision for a left door cluster may be associated with 1.5-hour labor estimate, whereas a replace decision for a left door cluster may be associated with a 1-hour labor estimate.

At step 220, the damage detection computing platform 110 may provide the cost estimate and/or the list of parts to the claims adjuster system 120 and/or the mobile system 150. A claims adjuster may perform a review or spot check of any aspect of the estimate, including the list of parts, the repair/replace determinations, the cost, and other such information generated by damage detection computing platform 110. Additionally or alternatively, the claims adjuster may compare the information to a manual estimate generated by the claims adjuster.

The claims adjuster system 120 may display information about the estimate and highlight certain discrepancies between any aspect of the automatic estimate and any manual estimate generated by the claims adjuster. Turning to FIG. 6, an example user interface 600 may include details of an automatic estimate generated by damage detection computing platform 110. For example, the automatic estimate information may display indications of each damaged parts cluster and an associated repair/replace decision. Further, the automatic estimate information may include a parts list and associated cost for each part, as well as an indication of whether the part is available used. The automatic estimate information may further include a projected labor time, a local labor cost, and a total cost based on the parts costs, labor rate, and labor time. The user interface 600 provided by the claims adjuster system 120 may allow editing of any aspect of the automatic estimate (e.g., adding, removing, or changing information), which may cause an update to the total cost based on the edit.

If a manual estimate generated by the claims adjuster differs by a significant amount (e.g., >20%) from the automatic cost estimate, the difference may be flagged for review. For example, the claims adjuster system 120 may provide an alert of the discrepancy by highlighting the manual estimate amount. In some examples, an alert may be sent to a system associated with a reviewer or other supervisory role, which may cause display of the user interface 600 to the reviewer.

The mobile estimate application 153, upon receipt of the estimate information, may cause the mobile system 150 to display a total amount of the proposed settlement. The mobile estimate application 153 may allow a user to accept the settlement and/or request a review of the settlement amount. The mobile estimate application 153 may cause the mobile system 150 to communicate a user's acceptance of the settlement or request for review back to the damage detection computing platform 110 and/or claims adjuster system 120, which may review the settlement and/or cause payment to the user.

Figure 2F:
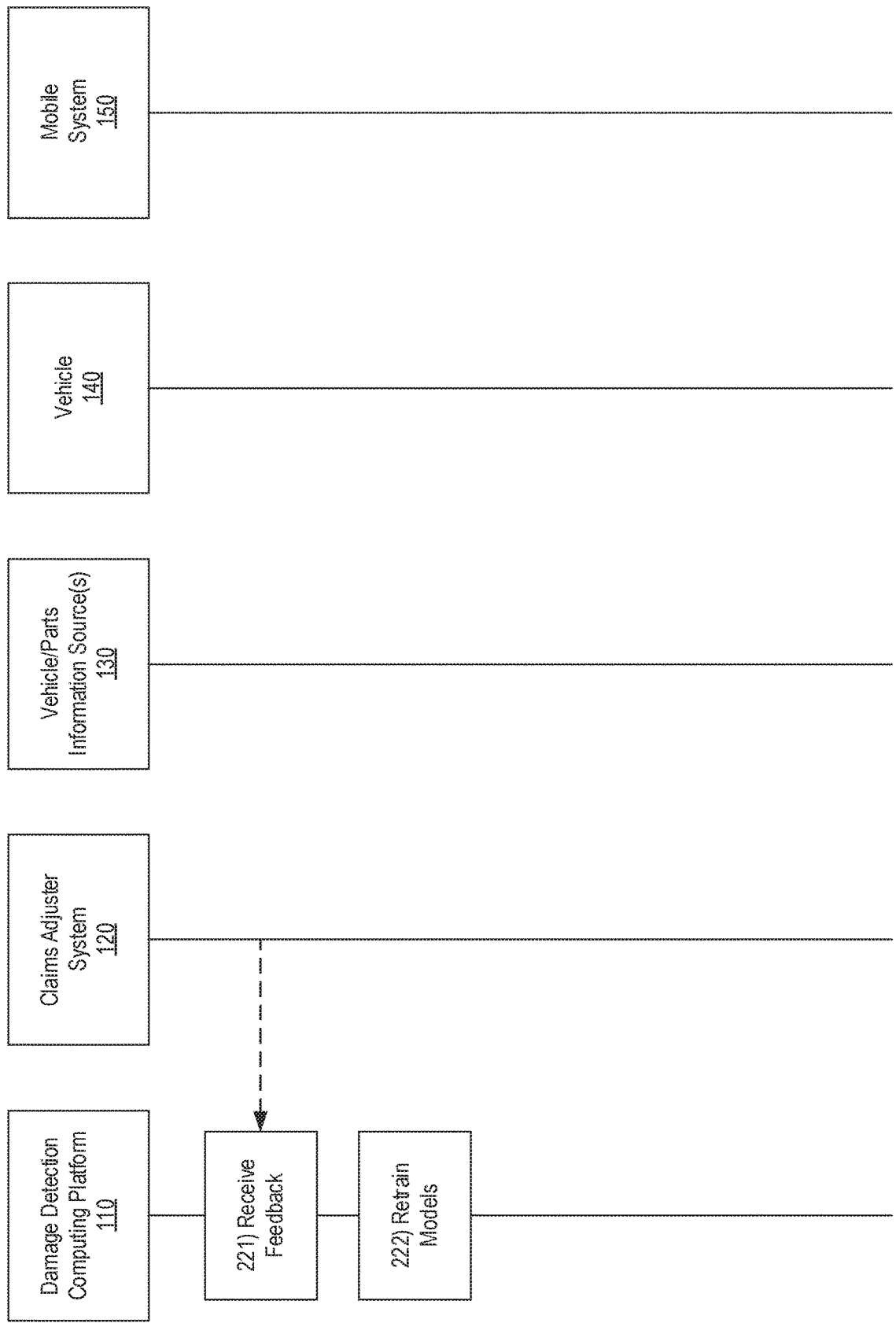

Turning to FIG. 2F, at step 221, the damage detection computing platform 110 may receive feedback from the claims adjuster system 120. Any edits to the list of parts that need to be repaired and/or replaced, to the determination of whether a particular part needs to be repaired, replaced, or is undamaged, to the total cost, or other such edits may be provided as feedback to damage detection computing platform 110.

Additionally, the claims adjuster may provide feedback on any other determination of any of models 116A-F. For example, the claims adjuster may provide feedback on whether the selected representative images were relevant and to what extent they were relevant. Turning to FIG. 7, the claims adjuster system 120 may present an example graphical user interface 700 for providing feedback on the most relevant photos. The user interface 700 may display the representative images and their determined relevancy scores. The user interface 700 may allow the claims adjuster to select which images were actually relevant and/or manually adjust a relevance score for each photo. The user interface 700 may further provide a function for reviewing the associated video so that the claims adjuster can manually select other frames of the video as being relevant and assign manual relevance scores. The claims adjuster system 120 may transmit any such feedback, including additional frames of video along with any manual relevance scores, back to damage detection computing platform. In similar fashion, the claims adjuster system 120 may provide other user interfaces for providing feedback on any output of any of models 116A-F, and such feedback may be transmitted to the damage detection computing platform 110.

The damage detection computing platform 110 may retrain the one or more models 116A-F based on the feedback received from the claims adjuster system 120. Data associated with the current settlement may be added into training sets along with the feedback on the output of the models 116A-F provided by the claims adjuster. For example, if the claims adjuster provided feedback on whether a particular frame contained a vehicle or not, the particular frame and the indication that it contained a vehicle or not may be added to the training data set for the object recognition model 116A. As another example, if the claims adjuster provided feedback on whether a particular frame contained damage or not (and/or the extent of damage, such as mild, medium, or severe), the particular frame and the indication of damage and/or the extent of damage may be added to the training data set for the damage model 116B. As another example, if the claims adjuster provided feedback on the angle and/or location of a particular frame, the particular frame and the angle and/or location of the frame may be added to the training data set for the angle model 116C. As another example, if the claims adjuster provided feedback on a particular frame and its relevance, the particular frame and the information indicating the relevance of the frame may be added to the training data set for the image selection model 116D. As another example, if the claims adjuster provided feedback on a particular frame and which parts cluster therein contains damage, the particular frame and the information indicating the parts cluster containing damage may be added to the training data set for the parts cluster damage model 116E. As another example, if the claims adjuster provided feedback on a particular frame and whether the parts cluster therein should be repaired or replaced, the particular frame and the information indicating the repair/replace decision may be added to the training data set for the relevant repair/replace damage model 116F. In this way, the accuracy of the models may improve over time.

Figure 8:
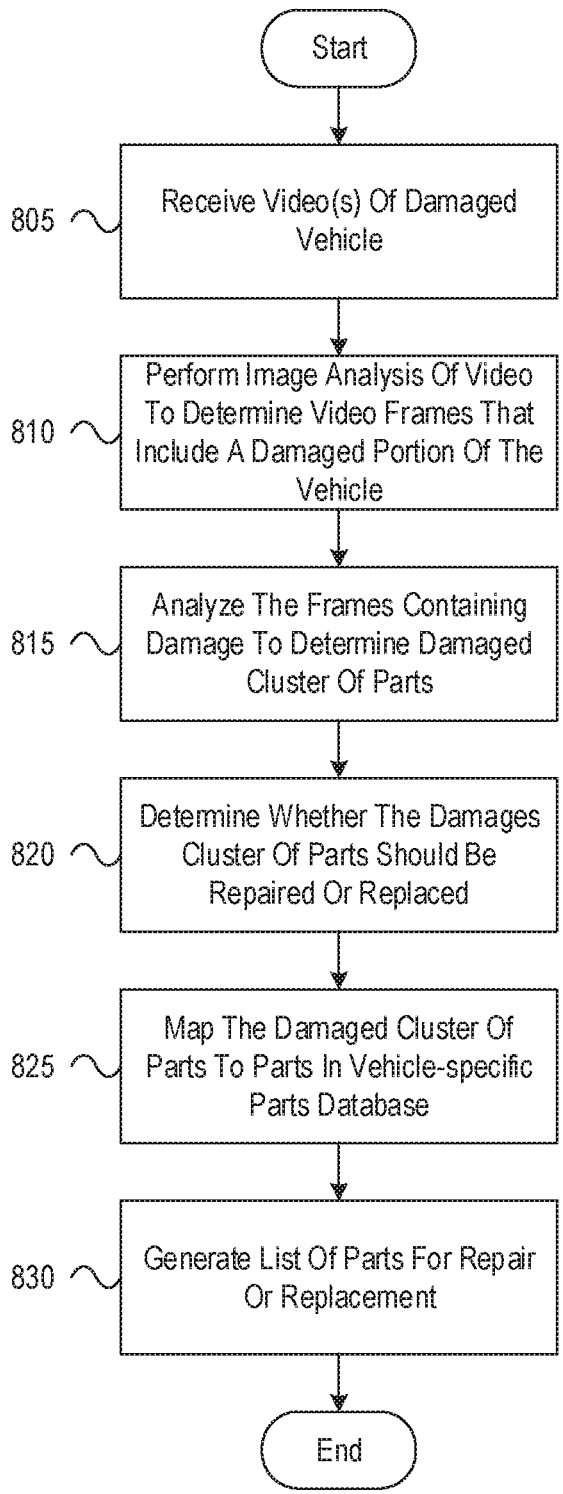
FIG. 8 depicts an illustrative method for analyzing images and videos of damaged vehicles in accordance with one or more example embodiments.

FIG. 8 illustrates a method for performing automatic analyses of images and videos of damaged vehicles to determine parts that are damaged, the extent of damage to the parts, and whether the damaged parts should be repaired or replaced, among other functions. At step 805, a computing platform comprising at least one processor, memory, and a communication interface may receive, via the communication interface, video of a damaged vehicle. At step 810, the computing platform may perform image analysis of the video to determine one or more frames of the video that include a damaged portion of the vehicle. At step 815, the computing platform may further analyze the one or more frames of the video that include a damaged portion of the vehicle to determine a damaged cluster of parts of the vehicle. At step 820, the computing platform may determine whether the damaged cluster of parts should be repaired or replaced. At step 825, the computing platform may map the damaged cluster of parts to one or more parts in a vehicle-specific database of parts. At step 830, the computing platform may generate, based on the mapping, a list of parts for repair or replacement.

The systems and methods described herein beneficially provide additional data for a vehicle damage analysis. By capturing one or more walk-around videos, a large number of images of a damaged vehicle may be provided, which alleviates problems caused by too few images, poor quality images, images from bad angles, and the like. The systems and methods described herein beneficially allow automatic selection frames of the walk-around videos that depict damage to the vehicle, have good lighting, and do not have reflections or occlusions that interfere with the analysis. The systems and methods described herein further allow generation of asymmetry information, which beneficially enables more accurate analysis of the damage to the vehicle and the parts of the vehicle. The systems and methods described herein further allow a determination which parts clusters of the vehicle are damaged, the extent of the damage, and whether the parts clusters need to be repaired and replaced, which beneficially provides for more accurate and reviewable cost estimates and settlement offers. Finally, systems and methods described herein allow manual review and feedback on the automatic analyses and determinations of the systems, which beneficially allows the systems and methods to improve accuracy over time by collecting additional training data and retraining models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure

What is claimed is:

1. A method comprising:
   at a computing platform comprising at least one processor, memory, and a communication interface:
   receiving, via the communication interface, video of a vehicle;
   automatically identifying, by the at least one processor, using image processing techniques including at least one of lighting analysis, reflection analysis, or occlusion analysis, a first frame of the received video of the vehicle that includes a damaged portion of a vehicle;
   automatically generating, by the at least one processor, using image processing techniques including at least one of normalizing, flipping, or warping, a modified frame of the received video of the vehicle;
   automatically generating, by the at least one processor, using a subtraction operation on the modified frame of the received video of the vehicle and the first frame of the received video of the vehicle, differential data comprising a plurality of values indicative of asymmetries in the vehicle;
   determining, by the at least one processor, based on the differential data, a vehicle-independent cluster of parts that is damaged;
   determining, by the at least one processor, a recommendation for repair or replacement of the vehicle-independent cluster of parts;
   mapping, by the at least one processor, the vehicle-independent cluster of parts that is damaged to one or more parts in a vehicle-specific database of parts; and
   generating, by the at least one processor, based on the mapping, a list of parts for repair or replacement.

2. The method of claim 1, wherein:
   the determining, based on the differential data, of the vehicle-independent cluster of parts that is damaged further comprises determining a damage level associated with the vehicle-independent cluster of parts.

3. The method of claim 2, wherein the determination of the recommendation for repair or replacement of the vehicle-independent cluster of parts is based on the damage level.

4. The method of claim 1, further comprising:
   determining a first angle of the first frame of the received video of the vehicle; and
   determining that the modified frame of the received video of the vehicle is associated with a second angle that is symmetrical with the first angle.

5. The method of claim 1, wherein the generating of the modified frame of the received video of the vehicle comprises:
   normalizing at least one of a color and a brightness of the modified frame of the received video of the vehicle.

6. The method of claim 1, wherein the generating of the modified frame of the received video of the vehicle further comprises:
   horizontally flipping and warping the modified frame of the received video of the vehicle.

7. The method of claim 1, further comprising:
   comparing the first frame of the received video of the vehicle to a preceding frame and a following frame of the received video of the vehicle to determine one or more motion vectors; and
   determining whether the first frame of the received video includes reflections or occlusions based on the one or more motion vectors.

8. The method of claim 1, wherein the image processing techniques comprise determining a lighting quality of one or more frames of the video.

9. The method of claim 1, further comprising:
   determining, based on the list of parts, and based on a local labor rate estimate, a cost to repair the vehicle.

10. The method of claim 9, further comprising:
    comparing the cost to repair the vehicle to a second cost received from a claims adjuster system; and
    responsive to the cost and the second cost differing by more than a threshold amount, sending an alert to the claims adjuster system.

11. The method of claim 9, further comprising:
    transmitting, to a mobile device, a settlement offer based on the cost; and
    receiving, from the mobile device, an acceptance of the settlement offer.

12. The method of claim 1, further comprising:
    selecting at least one frame of the received video of the vehicle as a representative frame of damage, wherein the selection is based on an angle of the at least one frame and a determination that the at least one frame does not include reflections or occlusions.

13. The method of claim 1, further comprising:
    based on information received from an accelerometer, determining a portion of the vehicle associated with damage; and
    causing a mobile device to display an indication of the portion of the vehicle associated with damage and an instruction to capture a video of the portion of the vehicle associated with damage.

14. The method of claim 13, wherein the instruction includes directions to capture a portion of the vehicle that is symmetrical to the portion of the vehicle associated with damage.

15. The method of claim 12, further comprising:
    transmitting the at least one representative frame to a claims adjuster system; and
    receiving, from the claims adjuster system, a corresponding relevance score for each of the at least one representative frames.

16. The method of claim 15, further comprising:
    training a model to predict a relevance of an image of a second damaged vehicle using the at least one representative frame and the corresponding relevance score.

17. A system comprising:
    a communication interface;
    one or more processors; and
    memory storing instructions that, when executed by the one or more processors, cause the one or more processors to:
    receive, via the communication interface, video of a vehicle;
    automatically identify, using image processing techniques including at least one of lighting analysis, reflection analysis, or occlusion analysis, a first frame of the received video of the vehicle that includes a damaged portion of a vehicle;
    automatically generate, using image processing techniques including at least one of normalizing, flipping, or warping, a modified frame of the received video of the vehicle;
    automatically generate, using a subtraction operation on the modified frame of the received video of the vehicle and the first frame of the received video of the vehicle, differential data comprising a plurality of values indicative of asymmetries in the vehicle;

determine, based on the differential data, a vehicle-independent cluster of parts that is damaged;

determine a recommendation to repair or replace the vehicle-independent cluster of parts that is damaged;

map the vehicle-independent cluster of parts to one or more parts in a vehicle-specific database of parts; and generate, based on the mapping, a list of parts for repair or replacement.

18. The system of claim 17, wherein:
the instructions configured to cause the system to determine, based on the differential data, the vehicle-independent cluster of parts that is damaged are further configured to cause the system to determine a damage level associated with the vehicle-independent cluster of parts.

19. The system of claim 17, wherein the instructions, when executed by the one or more processors, further cause the system to:
select at least one frame of the video as a representative frame of damage, wherein the selection is based on an angle of the at least one frame and a determination that the at least one frame does not include reflections or occlusions.

20. One or more non-transient computer-readable media storing instructions that, when executed by one or more processors of a system, cause the system to:
receive, via a communication interface, video of a damaged vehicle;

automatically identify, using image processing techniques including at least one of lighting analysis, reflection analysis, or occlusion analysis, a first frame of the received video of the vehicle that includes a damaged portion of a vehicle;

automatically generate, using image processing techniques including at least one of normalizing, flipping, or warping, a modified frame of the received video of the vehicle;

automatically generate, using a subtraction operation on the modified frame of the received video of the vehicle and the first frame of the received video of the vehicle, differential data comprising a plurality of values indicative of asymmetries in the vehicle determine, based on the differential data, a vehicle-independent cluster of parts;

determine a recommendation to repair or replace the vehicle-independent cluster of parts that is damaged;

map the vehicle-independent cluster of parts to one or more parts in a vehicle-specific database of parts; and generate, based on the mapping, a list of parts for repair or replacement.

* * * * *